(12) United States Patent
Kurosawa

(10) Patent No.: US 8,301,866 B2
(45) Date of Patent: Oct. 30, 2012

(54) PROCESSOR DELIVERING CONTENT INFORMATION RECOVERED UPON SEQUENCE OF PROCESSES PERFORMED BY DATA PATH RECONFIGURED BASED ON RECEIVED CONFIGURATION INFORMATION CONTAINING USE FREQUENCY

(75) Inventor: Takahiro Kurosawa, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 12/282,134

(22) PCT Filed: Mar. 29, 2007

(86) PCT No.: PCT/JP2007/057603
§ 371 (c)(1),
(2), (4) Date: Sep. 8, 2008

(87) PCT Pub. No.: WO2007/114477
PCT Pub. Date: Oct. 11, 2007

(65) Prior Publication Data
US 2009/0049285 A1 Feb. 19, 2009

(30) Foreign Application Priority Data
Mar. 30, 2006 (JP) ................... 2006-095852

(51) Int. Cl.
*G06F 15/177* (2006.01)
(52) U.S. Cl. .......................................... 712/15; 712/32
(58) Field of Classification Search ........................ None
See application file for complete search history.

(56) References Cited

U.S. PATENT DOCUMENTS

| | | | |
|---|---|---|---|
| 5,802,315 A * | 9/1998 | Uchiumi et al. | 709/247 |
| 5,881,244 A | 3/1999 | Uchiumi | |
| 5,968,167 A | 10/1999 | Whittaker | |
| 5,987,181 A | 11/1999 | Makiyama | |
| 6,549,577 B2 | 4/2003 | Florencio | |
| 6,697,105 B1 | 2/2004 | Kato | |
| 6,986,021 B2 * | 1/2006 | Master et al. | 712/15 |
| 7,093,023 B2 * | 8/2006 | Lockwood et al. | 709/231 |
| 7,408,850 B2 * | 8/2008 | Wittenburg et al. | 369/47.1 |
| 7,840,132 B2 * | 11/2010 | Paik | 396/310 |
| 2002/0009149 A1 | 1/2002 | Rodriguez | |

(Continued)

FOREIGN PATENT DOCUMENTS

JP 9-107544 4/1997

(Continued)

OTHER PUBLICATIONS

Japanese Office Action dated Jun. 17, 2011 issued during prosecution of related Japanese application No. 2006-095852, no translation.

(Continued)

*Primary Examiner* — Kenneth Kim
(74) *Attorney, Agent, or Firm* — Fitzpatrick, Cella, Harper & Scinto

(57) ABSTRACT

An information delivery apparatus includes an encoding information collection unit which collects information used to encode content information, a generation unit which predicts decode processes of the content information based on the collected information, and generates configuration information used to configure data paths required to execute the decode processes, an embedding unit which embeds the configuration information in the content information, and a delivery unit which delivers the content information embedded with the configuration information.

20 Claims, 17 Drawing Sheets

U.S. PATENT DOCUMENTS

2007/0019725 A1* 1/2007 Dei .................. 375/240.12

FOREIGN PATENT DOCUMENTS

| JP | 9-154131 | 6/1997 |
| JP | 9-289607 | 11/1997 |
| JP | 10-51779 | 2/1998 |
| JP | 2000-102005 | 4/2000 |
| JP | 2001-285179 | 10/2001 |
| JP | 2002-517109 | 6/2002 |
| JP | 2003-517797 | 5/2003 |
| JP | 2006-50571 | 2/2006 |
| WO | 01/45425 | 6/2001 |

OTHER PUBLICATIONS

Ha, Y., et al., "Building a Virtual Framework for Networked Reconfigurable Hardware and Software Objects", IMEC, International Conference on Parallel and Distributed Processing Techniques and Applications, Jun. 24, 2000, pp. 1-7.

Kopet, T., "Programmable Architectures for Real-Time Video Compression", Proceedings of the International Conference on Signal Processing Applications and Technology, Jan. 1, 1993, pp. 1031-1038.

European Search Report dated Sep. 19, 2011 issued during prosecution of related European application No. 07741039.7.

* cited by examiner

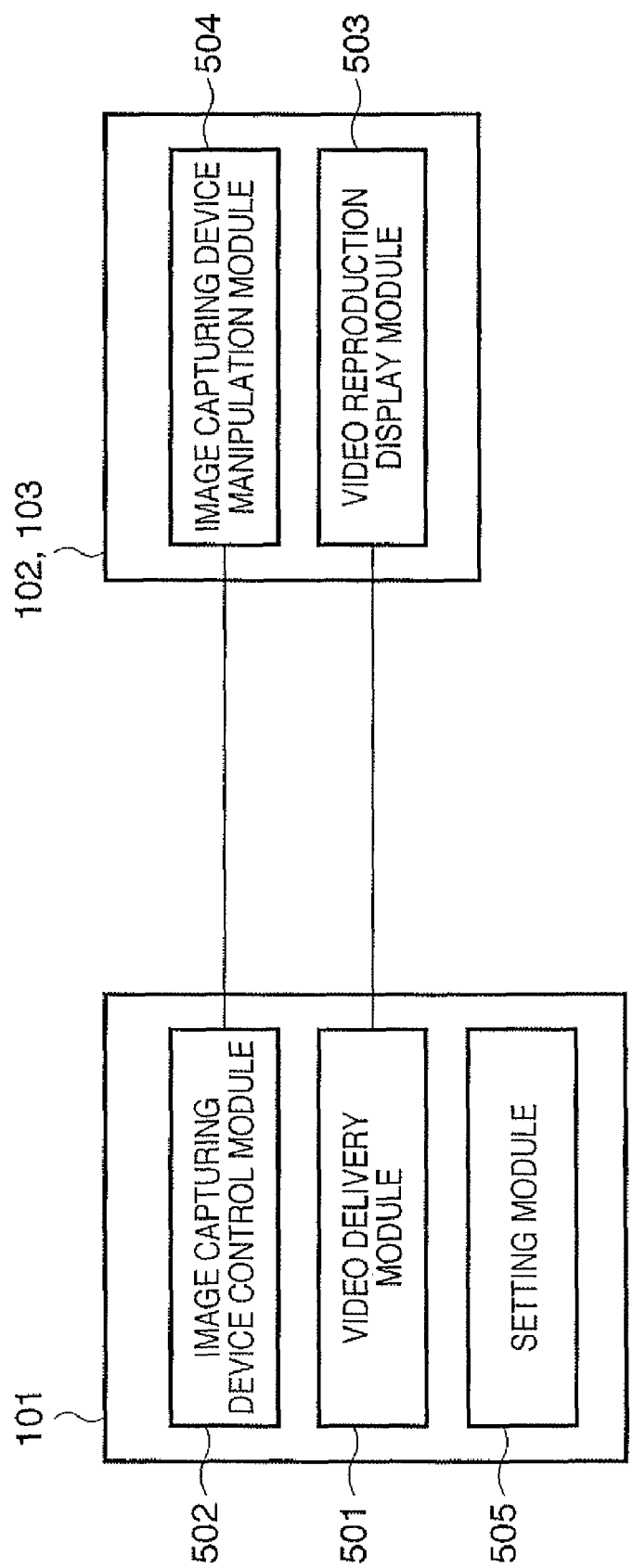

F I G. 5B
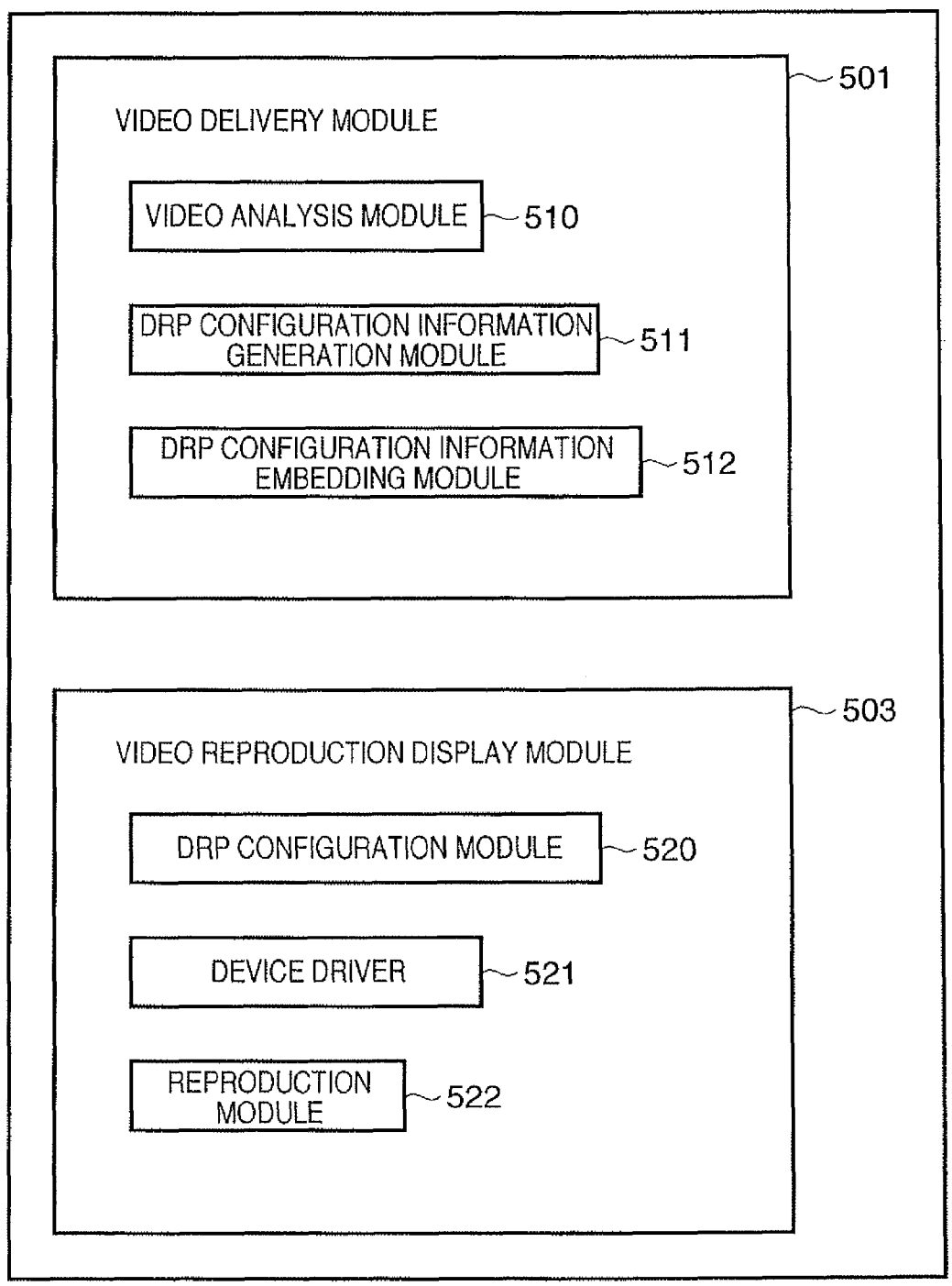

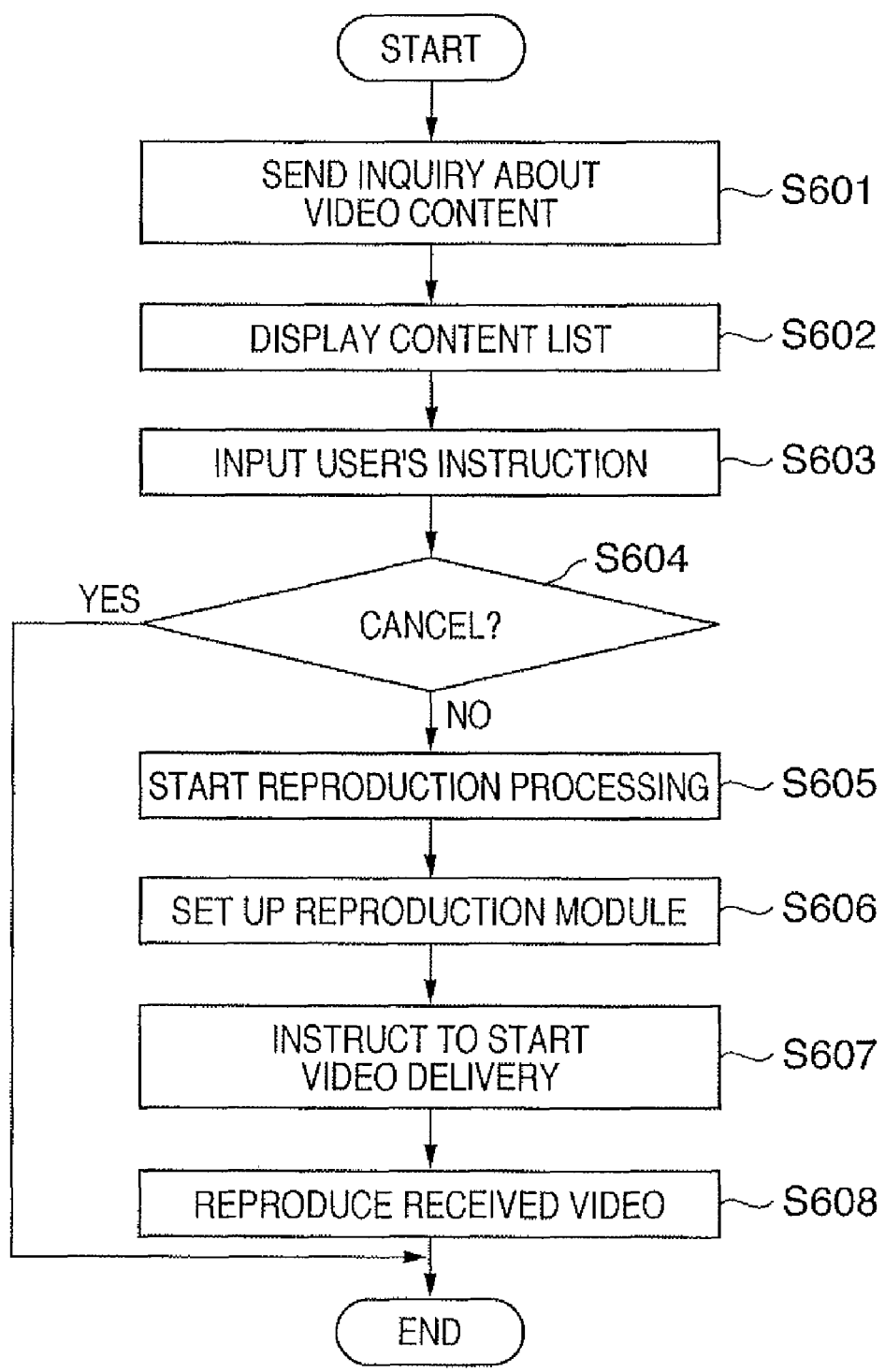

F I G. 14A
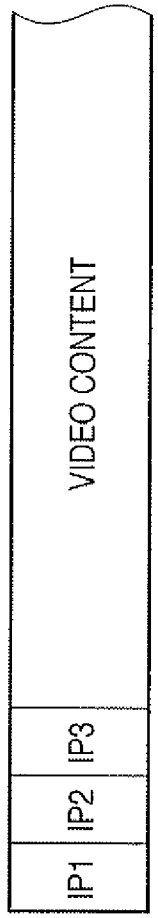
F I G. 14B
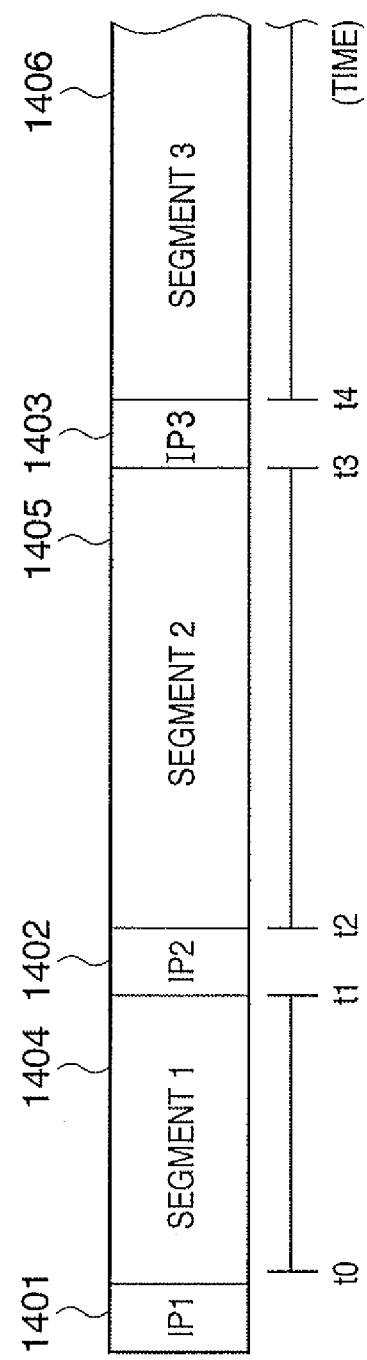
F I G. 14C

PROCESSOR DELIVERING CONTENT INFORMATION RECOVERED UPON SEQUENCE OF PROCESSES PERFORMED BY DATA PATH RECONFIGURED BASED ON RECEIVED CONFIGURATION INFORMATION CONTAINING USE FREQUENCY

TECHNICAL FIELD

The present invention relates to a technology for delivering video information and reproducing the delivered video information.

BACKGROUND ART

The background art of the present invention will be explained from the viewpoints of a network camera technology, network interconnection technology, home network connection technology, dynamically reconfigurable hardware technology, and the like.

[Network Camera Technology]

A technology for delivering a captured live video using a communication infrastructure such as the Internet or the like, and instructing camera settings, camera manipulations, and the like to capture a video has been established (e.g., Japanese Patent Laid-Open Nos. 09-289607 and 2001-285179). In a video delivery system or the like using the communication infrastructure, camera control such as pan, tilt, zoom, and backlight correction can be provided via a network in addition to video delivery. Such video delivery system comprises an access control function, and can limit camera control and video delivery in accordance with the user's access permissions.

Furthermore, this system can impose limitations on a region to be captured by the camera control. For example, the following limitations are imposed: an authorized user can use all zoom functions of a camera, but a normal user can use only some of the zoom functions. The same applies to pan and tilt functions.

PTP (Picture Transfer Protocol) has been specified as a protocol for manipulating a digital camera and digital camcorder via a device connection interface such as USB. The PTP allows standard image capturing settings, and transfer of videos of a digital camera. On the other hand, some camera devices have unique settings and manipulations which cannot be described by the PTP.

[Network Interconnection Technology]

As a technology for interconnecting devices connected to a network, for example, UPnP (Universal Plug and Play) was proposed in 1999 by Microsoft, and has been popularized and examined by the UPnP forum.

In the UPnP, the properties and capabilities of each other's devices are recognized via steps of (1) addressing, (2) discovery, and (3) description (capability description). The UPnP is specified to make (4) control, (5) sending an event, and (6) presentation based on the recognition in steps (1) to (3). In the description (capability description) step in the UPnP, capability descriptions of each other's devices to be connected are exchanged. The UPnP principally aims at reducing configuration by a user and the like as much as possible, by making manipulations or status reflection according to the capability of a communication partner in the subsequent control step and the event sending step.

[Home Network Connection Technology]

DLNA (Digital Living Network Alliance) is designing the specifications on the assumption of audio visual delivery use in home networks. The DLNA designs the specifications that strictly specify audio visual codecs and media transfer protocols based on the UPnP specifications (including the UPnP AV specifications) so as to further improve connectability.

The home network connection technology, such as the DLNA or the like, mainly covers delivery of video and music data stored in a storage device (storage) such as an HDD recorder or the like, but it can also be applied to delivery of live videos. For example, the UPnP AV specifications specify a media transfer protocol between Media Server and Media Renderer to be out-of-band. On the other hand, the DLNA specifications specify HTTP (HyperText Transfer Protocol) or RTP (Real-time Transport Protocol).

[Dynamically Reconfigurable Hardware Technology, Etc.]

A DRP (Dynamically Reconfigurable Processor) is a known dynamically reconfigurable hardware technology or dynamically reconfigurable processor.

A Field Programmable Gate Array, or FPGA, is a conventionally available dynamically reconfigurable hardware technology. The DRP is the same as the conventional FPGA since it allows operations and behaviors according to hardware configuration information, also called Intellectual Property, or "IP", by writing the hardware configuration information to a microprocessor or ASIC.

The DRP can designate the operations of the microprocessor or the like using the hardware configuration information, and forms processing blocks that implement information processing according to the hardware configuration information.

The DRP can rewrite the processing blocks for short time cycles (e.g., one clock), and can virtually develop many processing circuits in a limited LSI area compared to the FPGA which two-dimensionally develops and connects all processing blocks. As a result, the DRP can shorten the wiring length upon execution of certain processing and can increase the operation speed.

[Embedded Intellectual Property (IP) Technology]

A technology that implements various hardware design data and distributes them as embedded Intellectual Property (IP) has come into widespread use. Typically, various hardware module functions are described on a data path level. Then, the embedded IP is supplied as a library that can be linked to the logic synthesis development environment of hardware using HDL (Hardware Description Language: Verilog, VHDL, or the like) of the user.

In recent years, along with the prevalence of digital cameras or digital videos and the introduction of video devices in home, a wide variety of video content is easily generated. As a result, in order to handle a wide variety of video information (video content), digital cameras and digital video or hardware and software of players become larger in scale and more complicated, thus raising the development cost, purchase price, or consumption power of the devices.

Especially, video content are shared via networks in home, and different kinds of video content can be easily accessed, thus further distinguishing the aforementioned problems.

The present invention has been made to solve such problems, and has as its object to provide a technology that implements reproduction processing according to video information (video content) with low cost and low consumption power.

DISCLOSURE OF INVENTION

Embodiments of the present invention are provided to overcome the above-described drawbacks of the related technology.

According to an aspect of the present invention, an embodiment is directed to an information delivery apparatus which can deliver content information, comprising:

a generation unit adapted to generate configuration information required to configure data paths of a reconfigurable processor that executes reproduction processing of the content information; and a delivery unit adapted to deliver the content information and the configuration information generated by said generation unit.

According to another aspect of the present invention, an embodiment is directed to an information reproduction apparatus which receives and reproduces content information delivered by an information delivery apparatus, comprising:

a reconfigurable processor adapted to execute reproduction processing of the content information;

an assignment unit adapted to assign resources of said reconfigurable processor which reproduces the content information; and a configuration unit adapted to configure data paths of the resources of said reconfigurable processor assigned by said assignment unit based on configuration information delivered by the information delivery apparatus.

According to the present invention, reproduction processing according to video information can be implemented with low cost and low consumption power.

Further features of the present invention will become apparent from the following description of exemplary embodiments with reference to the attached drawings.

BRIEF DESCRIPTION OF DRAWINGS

FIG. 5A is a diagram showing the configuration of program modules according to the embodiment of the present invention;

FIG. 5B is a diagram showing an example of the configuration of program modules included in a video delivery module 501 and a video reproduction display module 503;

FIG. 6 is a flowchart for explaining the processing of the video reproduction display module 503 in the manipulation display terminal;

FIGS. 14A to 14C are views for exemplifying embedded states of hardware configuration information in video content;

BEST MODE FOR CARRYING OUT THE INVENTION

First Embodiment

The first embodiment of the present invention will be described hereinafter with reference to the accompanying drawings. An information delivery apparatus according to the embodiment comprises an arrangement which predicts and analyzes reproduction processing of information to be delivered, and can embed hardware configuration information (IP) in the information to be delivered. Content information to be delivered by the information delivery apparatus includes, for example, audio information, music information, and video information, i.e., still images and moving images, with delivery of moving images to be described in detail in the second embodiment, and with these pieces of information to be referred to as "content information" hereinafter. In the following description, delivery of video information, or video content will be exemplified. However, the gist of the present invention is not limited to such specific example, and the content information to be delivered includes audio information, including music information and the like.

The information delivery apparatus according to the embodiment predicts data paths of reproduction processing according to the contents of a video content, and embedding a plurality of IPs at the head the video content in turn, from data paths to be used frequently.

Figure 1:
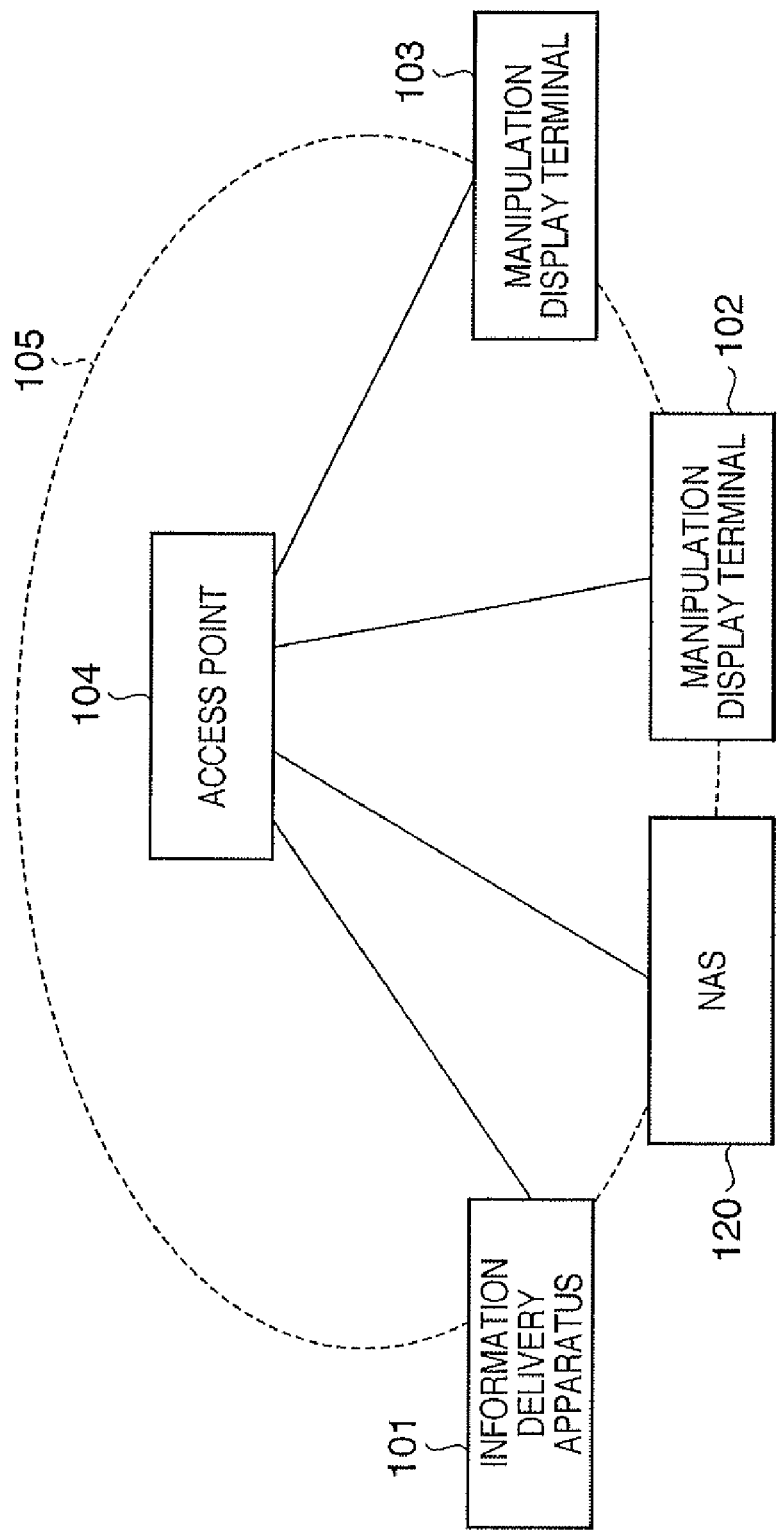
FIG. 1 is a diagram showing a typical use mode of an information delivery apparatus according to an embodiment of the present invention.
Figure 13:
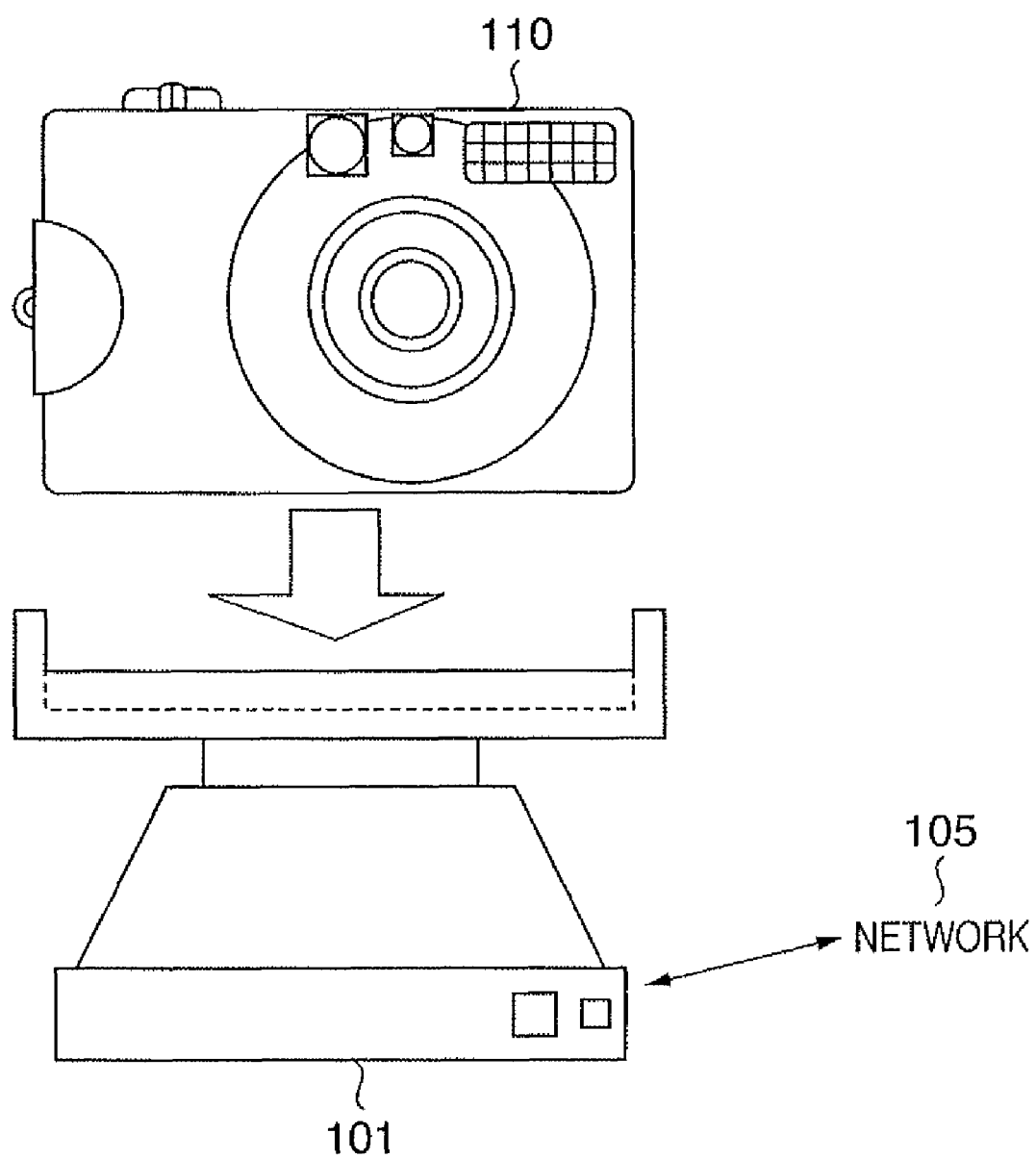
FIG. 13 is a view for exemplifying a state in which an image capturing device 110 is attached to the information delivery apparatus 101.

FIG. 1 is a diagram showing a typical use mode of an information delivery apparatus according to the embodiment of the present invention. An information delivery apparatus (video content source) 101 and manipulation display terminals (video viewers) 102 and 103 are connected to a network 105. An image capturing device 110 can be detachably attached to the information delivery apparatus 101. FIG. 13 exemplifies a state in which the image capturing device 110 is attached to the information delivery apparatus 101. The image capturing device 110 includes devices which can capture still images or moving images such as digital cameras, digital video cameras, and the like. The information delivery apparatus 101 can deliver image data captured by the image capturing device 110 as a video content via the network 105 while embedding hardware configuration information (IP) in the video content.

To the network 105, a network attached storage (NAS) 120 is further connected. The NAS 120 can accept a data storage or browse request from other devices connected to the network 105. The NAS 120 can also comprise a home NAS, a large-scale NAS for business use, or a storage service provided by another device.

The manipulation display terminal 102 sends a video delivery request to the information delivery apparatus 101 via a network access point (access point (AP)) 104. Upon reception of the video delivery request, the information delivery apparatus 101 delivers video data corresponding to the video delivery request to the manipulation display terminal 102 via the access point 104. Upon reception of the delivered video data, the manipulation display terminal 102 allows the user to watch a video at the terminal.

Also, the manipulation display terminal 102 or 103 can send manipulation requests such as pausing, fast-forwarding, and the like of the video content to be sent, and an image capturing request of a video content using the image capturing device 110 to the information delivery apparatus 101 via the access point 104.

In FIG. 1, the network 105 may be a network managed in home or an organization, or the Internet, which is in widespread use. Furthermore, two-way communication media between devices may be wired or wireless.

(Example of Arrangement of Information Delivery Apparatus)

Figure 2:
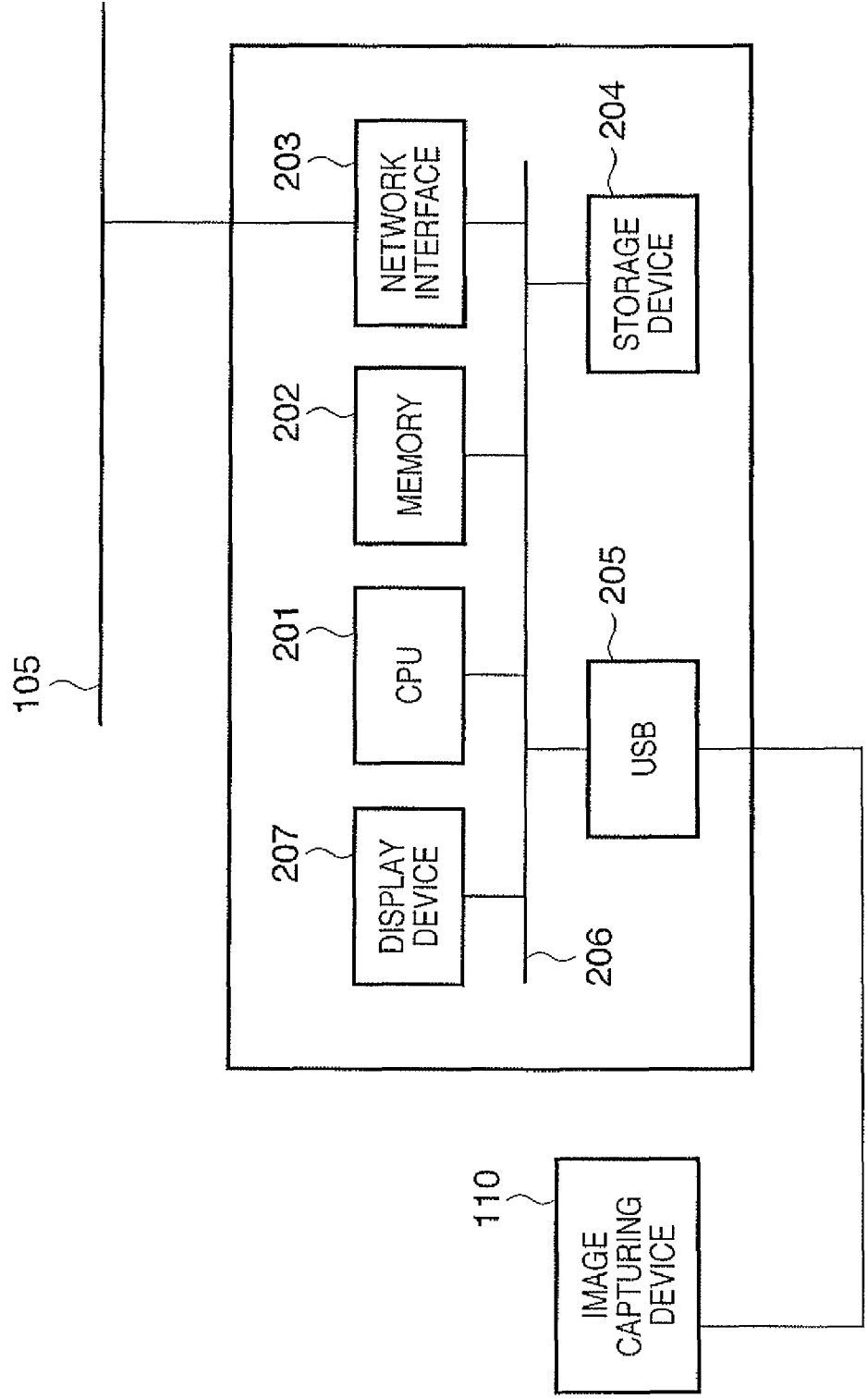
FIG. 2 is a block diagram showing an example of the hardware arrangement which makes an information delivery apparatus 101 operate.

FIG. 2 is a block diagram showing an example of the hardware arrangement which makes the information delivery apparatus 101 operate. The information delivery apparatus 101 has a storage device 204 which stores programs and processing results, a CPU 201 which executes various kinds of processing based on programs, and a network interface 203 required to connect the network 105. Furthermore, the information delivery apparatus 101 has a USB interface (USB) 205 required to connect the image capturing device 110 such as a digital camera or the like, and a memory 202 which serves as a work area upon execution of processing by the CPU 201. Also, the information delivery apparatus 101 comprises a display device 207, which can display setting information of program modules, update results of the setting information based on user's operation input, and the like.

The CPU 201, memory 202, network interface 203, storage device 204, USB 205, and display device 207 are connected via an internal bus 206 of the information delivery apparatus 101, and can communicate with each other.

The storage device 204 may comprise a non-volatile memory such as an HDD device, flash memory, or the like in addition to a RAM that allows high-speed access, or may comprise a removable storage device. The network interface 203 may comprise a wireless interface in addition to a wired interface. The interface used to connect the image capturing device 110 (e.g., digital camera) is not limited to USB, and may comprise, e.g., IEEE 1394.

(Description of Reconfigurable Processor)

Figure 3:
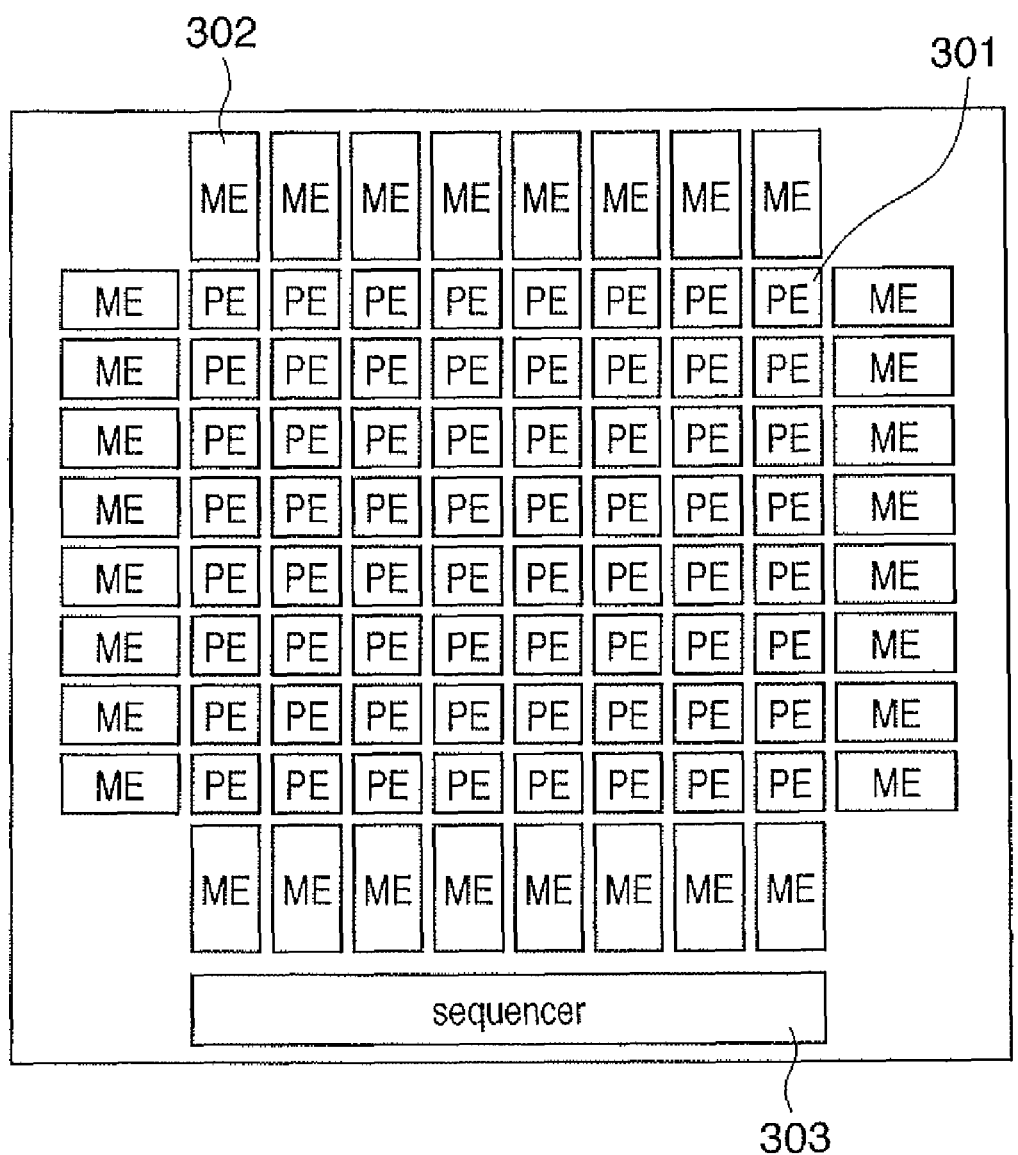
FIG. 3 is a view for explaining a reconfigurable processor (DRP) according to the embodiment of the present invention.

FIG. 3 is a view for explaining a reconfigurable processor (DRP) according to the embodiment. A DRP core has 64 (8×8) PEs processing elements 301 arranged in a matrix as basic units, and MEs memory elements 302 located around the PEs.

Furthermore, the DRP comprises data switches (not shown) which freely couple elements such as the PEs 301 and MEs 302, a sequencer 303 which designates a data path plane described in hardware configuration information (IP), and the like. The DRP can be configured by one or more DRP cores, an FPU (Floating Point Unit), an external memory controller, an inter-processor communication controller such as a bus or the like, a clock, and the like.

The sequencer 303 can cooperate the PEs 301 and MEs 302 by switching the data path plane of the PEs 301 and MEs 302 in the DRP. When the DRP comprises a plurality of sequencers 303, a data path plane can be configured for some designated PEs 301 and MEs 302.

The sequencer 303 can issue a data path plane designation pointer in response to a trigger event from the PEs 301. Also, the sequencer 303 can also issue the data path plane designation pointer in response to an external signal from the CPU 201 or the like. The sequencer 303 can reconfigure the data path plane configured by a combination of the PEs by switching processing functions of each PE 301 by the designation pointer.

The configuration of the DRP core is not limited to that of the 8×8 matrix of the PEs 301. For example, the sequencers 303 of a plurality of DRP cores may share a pointer signal used to designate the data path plane to configure a data path plane with a larger scale. The individual sequencers 303 may be independently controlled and may be assigned with different tasks.

Figure 16A:
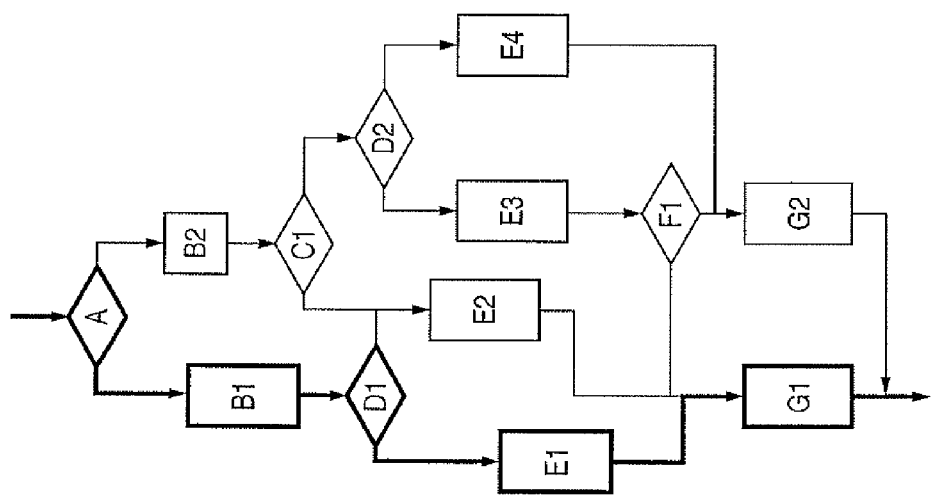
FIGS. 16A and 16B are views for exemplifying data paths to be analyzed depending on video content.
Figure 16B:
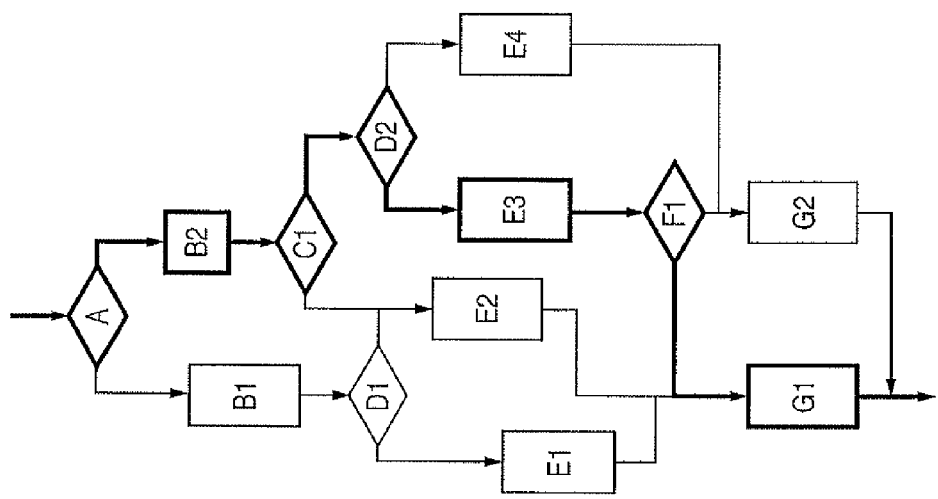

FIGS. 16A and 16B exemplify data paths analyzed depending on video contents. A data path of reproduction processing starts from, e.g., checking process A to execute process B1 or B2. In a data path of process B1, process E1 or E2 is executed depending on the checking result in process D1, and the process then ends after execution of process G1.

On the other hand, in a data path of process B2, the process advances to process E2 or D2 depending on a result of checking process C1. A data path which advances to process E2 ends after execution of process G1.

Process E3 or E4 is executed depending on the checking result in checking process D2. A data path that advances to process E3 ends after execution of process G1 or G2 depending on the checking result in checking process F1. A data path that advances to process E4 ends after execution of process G2.

Resources (PE 301, ME 302, and the like) of an information processing processor (DRP 407) on the reproduction side are assigned according to the scale and operating status of the information processing processor. Hardware configuration information (IP) is generated to designate a data path plane which minimizes consumption power and the like on the reproduction side (manipulation display terminal 102 or 103) by the assigned resources of the information processing processor (DRP 407).

For example, upon reproducing video content A, a data path (indicated by the bold line) in FIG. 16A is predicted, and hardware configuration information (IP) is generated to designate this data path and is embedded in video content A. Upon reproducing another video content B, a data path (indicated by the bold line) in FIG. 16B is predicted, and hardware configuration information (IP) is generated to designate the data path and is embedded in video content B.

(Example of Arrangement of Manipulation Display Terminal)

Figure 4:
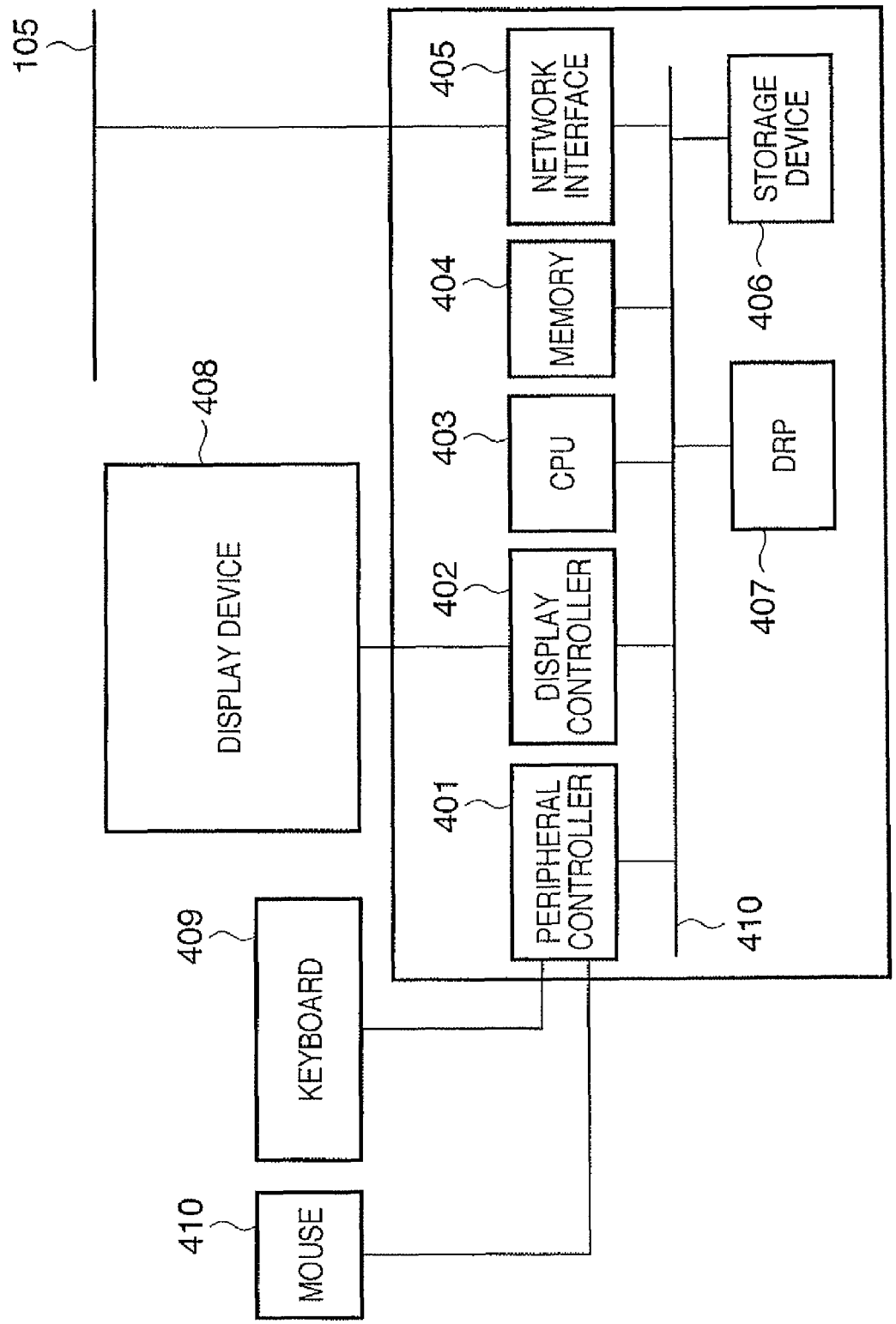
FIG. 4 is a block diagram showing an example of the hardware arrangement which makes manipulation display terminals 102 and 103 operate.

FIG. 4 is a block diagram showing an example of the hardware arrangement which makes the manipulation display terminals 102 and 103 operate. Each of the manipulation display terminals 102 and 103 has a storage device 406 which stores programs and processing results, a CPU 403 which executes various kinds of processing based on programs, and a network interface 405 required to connect the network 105. Each of the manipulation display terminals 102 and 103 has a display device 408 which displays processing results and video content, a display controller 402 which controls the display device 408, and a memory 404 which serves as a work area upon execution of processing by the CPU 403. Furthermore, each of the manipulation display terminals 102 and 103 has a peripheral controller 401 which accepts a user's inputs, and a DRP 407 which is dynamically reconfigurable according to hardware configuration information (IP). The peripheral controller 401, display controller 402, CPU 403, memory 404, network interface 405, storage device 406, and DRP 407 are connected via an internal bus 410 of the manipulation display terminal, and can communicate with each other.

The storage device 406 may comprise a non-volatile memory such as an HDD device, flash memory, or the like in addition to a RAM that allows high-speed access, or may comprise a removable storage device. The network interface 405 may comprise a wireless interface in addition to a wired interface.

The peripheral controller 401 accepts input information input from input devices, for example, a keyboard 409 and a mouse 410, and passes data to the CPU 403, storage device 406, and the like via the internal bus 410. Note that the input devices are not limited to the keyboard 409, mouse 410, and the like, and a manipulation unit such as an infrared remote controller or the like may be used. When the infrared remote controller is used as the input device, the peripheral controller 401 may be configured as an LED controller or external sensor input/output controller.

The DRP 407 may be an independent processor, or a functional circuit (IP core) mounted on an LSI of the CPU 403 or the like.

The configuration of program modules installed in the information delivery apparatus 101 and manipulation display terminals 102 and 103 will be described below. FIG. 5A is a diagram showing the arrangement of program modules. The information delivery apparatus 101 includes a video delivery module 501, image capturing device control module 502, and setting module 505. Each of the manipulation display terminals 102 and 103 includes a video reproduction display module 503 and image capturing device manipulation module 504. These program modules are stored in the storage devices 204 and 406 in the respective apparatuses, and can be executed by the CPUs 201 and 403 of the respective apparatuses, and the DRPs 407 in the manipulation display terminals 102 and 103.

FIG. 5B is a diagram showing an example of the configuration of program modules included in the video delivery module 501 and video reproduction display module 503. The video delivery module 501 includes a video analysis module 510, DRP configuration information generation module 511, and DRP configuration information embedding module 512.

The video reproduction display module 503 includes a reproduction module 522 which executes reproduction of the delivered video content, a DRP configuration module 520, a device driver 521 which requests the DRP of some reproduction processes, and the like. The practical processing of the program modules according to the embodiment of the present invention will be described later with reference to FIGS. 6 to 12.

Commands which the information delivery apparatus 101 receives from the manipulation display terminal 102 or 103 via the network 105 and access point 104 can be categorized as follows.

(1) Session Control Command

Some commands require that a session be established between the information delivery apparatus 101 and manipulation display terminal 102 or 103. A session control command is specified as a command for the purpose. For example, the category of the command includes a session start command and end command.

(2) Image Capturing Device Control Command

A command used to transfer the image capturing device control right is specified for manipulation commands which require exclusive access control in access on the information delivery apparatus 101. For example, manipulations such as a zoom manipulation of the image capturing device 110, delivered video delete manipulation, and the like require exclusive access control. The manipulation display terminal 102 or 103 which holds the image capturing device control right can control the image capturing device 110 with this command. Note that not only control of the image capturing device 110 but also some commands (e.g., panpod pan/tilt control or the like) associated with the information delivery apparatus 101 are included in this command category since the image capturing device control right is required.

(3) Camera Browse Command

This command is a manipulation command associated with the internal state (including storage and delivery of stored video contents and the like) on the information delivery apparatus 101.

(4) Image Capturing Device Setting Command

This command is a manipulation command used to change the settings of the information delivery apparatus 101.

(Operation Flowcharts of Manipulation Display Terminals and Information Delivery Apparatus)

The operation flowcharts of the manipulation display terminals 102 and 103 and the information delivery apparatus 101 will be described hereinafter. Note that the manipulation display terminals 102 and 103 have already separately acquired connection information to the information delivery apparatus 101, routing information to the AP (access point) 104 in the middle of a route, and the like. Since these pieces of information can be acquired using the known IP (Internet Protocol) technology, UPnP (Universal Plug-n-Play) technology, Web (World Wide Web) technology, and the like, a description thereof will be omitted.

(Processing of Video Reproduction Display Module 503)

FIG. 6 is a flowchart for explaining the processing of the video reproduction display module 503 in the manipulation display terminal 102 or 103. The CPU 403 executes the processing of the video reproduction display module 503.

In step S601, the CPU 403 sends an inquiry about video contents that can be provided by the information delivery apparatus 101. Note that video contents include video contents stored in the information delivery apparatus 101, and live video contents acquired from the image capturing device 110. These contents will be generically referred to as video contents.

Assume that each video content is appended with information such as the resolution, codec, reproducing time, data rate (bit rate), title and language, or the like, and video content attribute information such as an access control attribute, copyright protection scheme (including an encryption/decryption scheme), or the like.

Upon sending the inquiry in this step, the CPU 403 can designate video contents by designating some pieces of video content attribute information. For example, the CPU 403 may designate to request the information delivery apparatus 101 to add, to an inquiry result, information indicating whether or not each video content includes hardware configuration information (IP) of the DRP 407, the scale (how to built the data path plane) of the hardware configuration information (IP), and the like. The information delivery apparatus 101 sends the inquiry result of the video content to the manipulation display terminal 102 or 103 as a request source.

In step S602, the CPU 403 displays a list of video content obtained from the information delivery apparatus 101 on the display device 408, and waits for a user's selection instruction about which of video contents is to be reproduced.

In step S603, the CPU 403 receives the user's selection instruction. If the user cancels reproduction (YES in S604), the process ends.

On the other hand, if it is determined in step S604 that the CPU 403 receives the user's selection instruction indicating that he or she designates one of the video content which are displayed in the list, and requests to reproduce it (NO in S604), the process advances to step S605.

In step S605, the CPU 403 starts reproduction processing of the video content selected by the user. The CPU 403 launches the reproduction module 522 which executes the reproduction processing of the video content.

In step S606, the CPU 403 acquires various kinds of information required for the reproduction module 522, and sets up the reproduction module 522. Note that various kinds of information required to set up the reproduction module 522 include information which is acquired from the information delivery apparatus 101 and is associated with the resolution, codec, copyright protection scheme (including an encryption/decryption scheme), or the like of the video content to be reproduced. The reproduction module 522 in this embodiment is configured to request the manipulation display terminal DRP processing of some reproduction processes based on the hardware configuration information (IP) designated in the video content.

In step S607, the CPU 403 instructs the information delivery apparatus 101 to deliver the designated video content.

In step S608, the CPU 403 receives information sent from the information delivery apparatus 101, and the reproduction module reproduces the video content on the display device 408 based on the received information.

Note that the information of the video content includes information obtained by appropriately demultiplexing video and audio streams multiplexed on the communication path with the information delivery apparatus 101, and appropriately coupling packetized video bitstreams. Since the processing in the reproduction module 522 is the same as normal video bitstream reproduction processing, a description thereof will be omitted.

Also, a hardware configuration information (IP) group of the DRP which is embedded in the video content is demultiplexed before the beginning of the processing of this step (S608). The hardware configuration information (IP) group demultiplexed (extracted) from the video content is transferred to the DRP configuration module 520 (see FIG. 5B) of the video reproduction display module 503. The DRP configuration module 520 reconfigures the hardware configuration (processing elements PE (FIG. 3)) based on the received hardware configuration information (IP) group.

The reproduction module 522 can reproduce the video content using the reconfigured processing elements PE of the DRP 407 in the process of step S608.

In accordance with the hardware configuration information (IP) demultiplexed from the video content, re-setup or substitution of the reproduction module 522 can be made.

After completion of step S608, the process ends. Note that if the user's cancel manipulation is determined in step S604, the processing of the video reproduction display module 503 ends. Alternatively, the process may return to step S601, S602, or S606, and the manipulation display terminal may be set in a standby state to wait for a user's instruction again.

(Processing of Image Capturing Device Manipulation Module 504)

Figure 7:
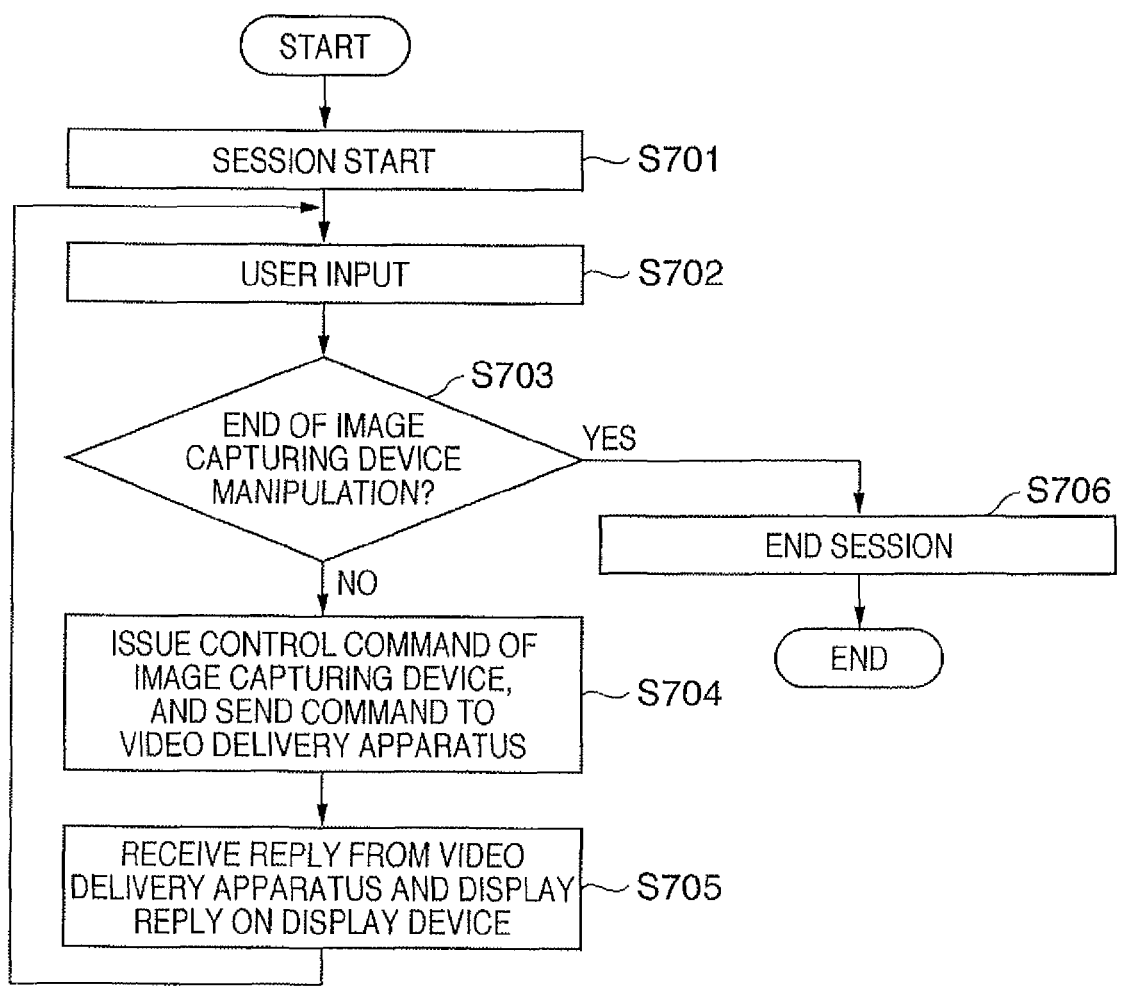
FIG. 7 is a flowchart for explaining the processing of an image capturing device manipulation module 504 in the manipulation display terminal.

FIG. 7 is a flowchart for explaining the processing of the image capturing device manipulation module 504 in the manipulation display terminal 102 or 103. The CPU 403 executes the processing of the image capturing device manipulation module 504.

In step S701, the CPU 403 displays a GUI associated with manipulations of the image capturing device 110 on the display device 408. The CPU 403 establishes a session between the information delivery apparatus 101 and manipulation display terminal 102 or 103 using the aforementioned session control command.

In step S702, the CPU 403 waits for a user's instruction associated with a manipulation of the image capturing device 110.

The CPU 403 receives a user's instruction associated with a manipulation of the image capturing device 110, and checks in step S703 if the user's instruction is a manipulation end instruction of the image capturing device 110.

If the user's instruction is a manipulation end instruction of the image capturing device 110 (YES in S703), the CPU 403 advances the process to step S706, thus ending the session.

On the other hand, if it is determined in step S703 that the user's instruction is not a manipulation end instruction of the image capturing device 110 (NO in S703), the CPU 403 advances the process to step S704.

In step S704, the CPU 403 issues a control command of the image capturing device 110 for the designated control of the image capturing device 110, and sends the command to the information delivery apparatus 101.

In step S705, the manipulation display terminal 102 or 103 receives, from the information delivery apparatus 101, a video content captured by the image capturing device 110 as a response (reply) to the control command of the image capturing device issued in step S704 above. The CPU 403 controls the reproduction module 522 to display the received video content on the display device 408 of the manipulation display terminal 102 or 103 in accordance with its content.

Upon completion of the process in step S705, the process returns to step S702 again to repeat the same processes.

When the manipulation of the image capturing device 110 is to end finally, the CPU 403 advances the process to step S706, and ends the session between the information delivery apparatus 101 and manipulation display terminal 102 or 103.

Note that the information delivery apparatus 101 can append hardware configuration information (IP) to the video content delivered in step S705 in FIG. 7, and can deliver the video content to the manipulation display terminal 102 or 103. The manipulation display terminal 102 or 103 demultiplexes (extracts) a hardware configuration information (IP) group from the video content (captured by the image capturing device 110) sent from the information delivery apparatus 101, and transfers it to the DRP configuration module 520. The DRP configuration module 520 reconfigures the hardware configuration (processing elements PE (FIG. 3)) based on the transferred hardware configuration information (IP) group. The reproduction module 522 can reproduce the video content captured by the image capturing device 110 using the reconfigured processing elements PE of the DRP 407.

(Processing of DRP Configuration Module 520)

Figure 8:
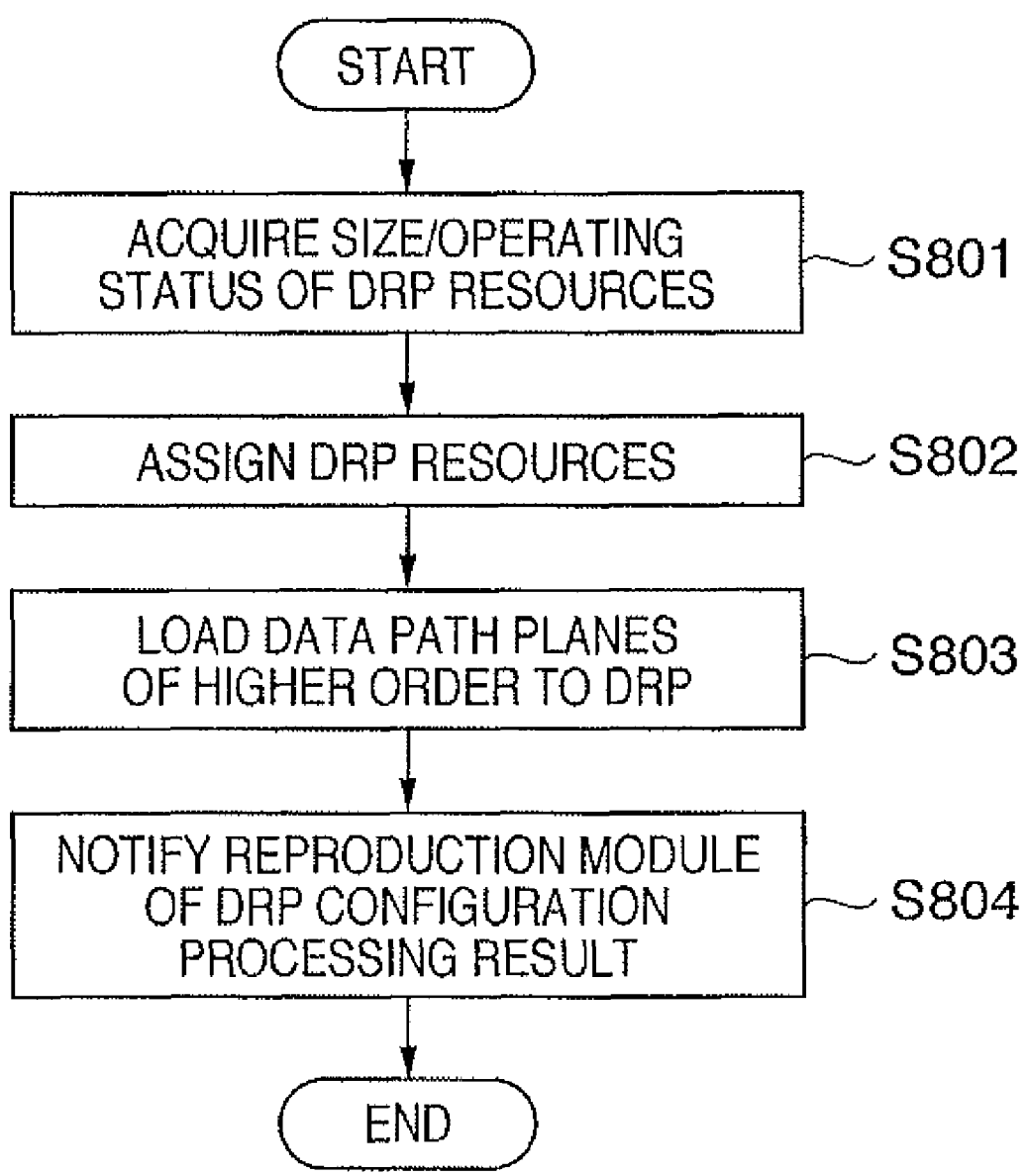
FIG. 8 is a flowchart for explaining the processing of a DRP configuration module 520 in the manipulation display terminal.

The processing of the DRP configuration module 520 in the manipulation display terminal 102 or 103 will be described below with reference to FIG. 8. The CPU 403 executes the processing of the DRP configuration module 520.

In step S801, the CPU 403 acquires information associated with the scale (size) and operating status of the resources of the DRP 407 equipped in the manipulation display terminal 102 or 103.

In step S802, the CPU 403 assigns the resources of the DRP 407 in association with the reproduction processing of the video content based on at least one of the acquired information associated with the scale (size) and operating state of the DRP 407. Typically, the CPU 403 can assign processing elements PE as idle DRP resources of those which configure the DRP 407. Furthermore, the CPU 403 can set DRP resources to be assigned to reproduce of the video content in consideration of conditions such as priority of processing and the like.

In step S803, the CPU 403 loads a data path plane into the DRP 407 (it reconfigures the resources of the DRP 407). For example, the CPU 403 loads data path planes of higher levels (higher priority levels) of the designated hardware configuration information group for the DRP in correspondence with the resources of the DRP 407 assigned in step S803 above.

In step S804, the CPU 403 notifies the reproduction module 522 of success or failure of loading, a sequence number (instruction pointer of the DRP 407) assigned to each data path plane, and the like. The reproduction module 522 can execute reproduction processing of the video content using the configured data path planes via the sequence numbers.

If necessary, the reproduction module 522 may be substituted and may then be re-set up.

For example, assume that the DRP 407 of the manipulation display terminal 102 or 103 is configured by PEs which can hold 256 data path planes, and processing for 200 data path planes of these planes is being executed at a higher priority level than the video reproduction processing of this embodiment. In this case, the remaining 56 planes are data path planes which can be used in the video reproduction processing. In this case, of the hardware configuration information (IP) group designated in the video content, the DRP 407 of the manipulation display terminal 102 or 103 is reconfigured (loaded) in turn by the IPs of higher priority levels.

(Processing of DRP Configuration Information Generation Module 511)

Figure 9:
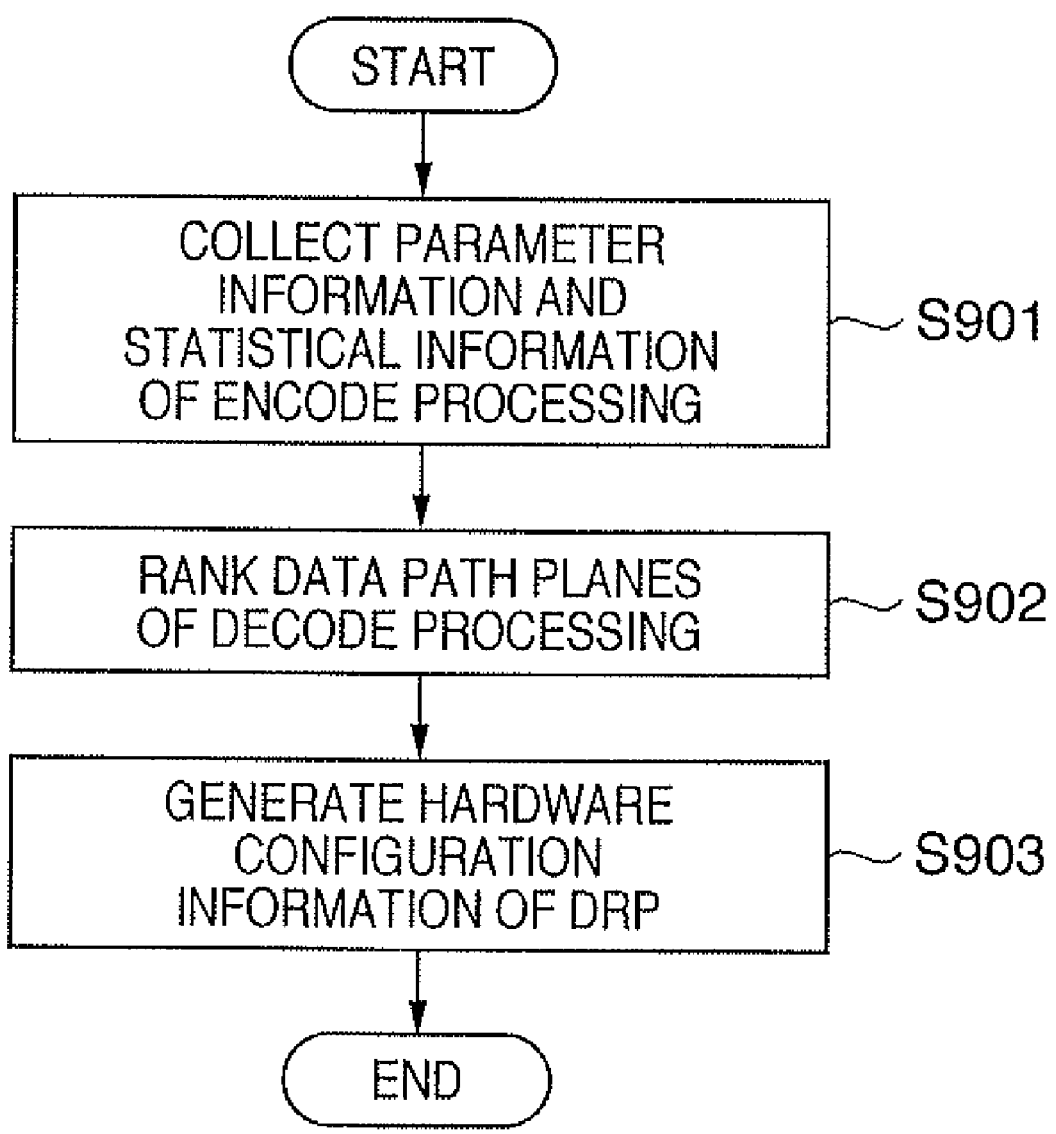
FIG. 9 is a flowchart for explaining the processing of a DRP configuration information generation module 511 in the information delivery apparatus 101.

FIG. 9 is a flowchart for explaining the processing of the DRP configuration information generation module 511 in the image capturing device 110.

This processing of the DRP configuration information generation module 511 predicts a data path used in the reproduction processing of the reproducer (manipulation display terminal 102 or 103) upon execution of the encoding processing by the information delivery apparatus 101. Then, this processing can generate a hardware configuration information (IP) group for the DRP 407, which is embedded in the video content. The CPU 201 executes the DRP configuration information generation module 511.

In step S901, the CPU 201 collects parameter information for each encode rule applied to the encode processing of the video content, and statistical information of encoded video data generated during the encode processing.

Note that the parameter information for each encoding rule includes, e.g., a macroblock division size, the presence/absence and range of intra-frame prediction, the presence/absence of B-frames (Bi-directional frames), the range of reference frames, bit rate control information, and the like. Also, the parameter information may include unique parameters depending on encode schemes. For example, the parameter information may include mode designation of CABAC (Context-based Adaptive Binary Arithmetic Coding) of H.264 (MPEG-4 Part 10 AVC) or the like.

In step S902, the CPU 201 predicts processes of decode processing from the information collected in step S901 above. More specifically, the CPU 201 calculates use statistics (frequencies) of data paths in the decode processing, and ranks respective data paths.

In step S903, the CPU 201 generates hardware configuration information (IP) of the DRP for the video content based on the ranks of the data paths of the respective decode processes and the size of the corresponding hardware configuration information of the DRP. In the process of step S902, if there are a plurality of hardware configuration information (hardware configuration information group) required to configure a plurality of ranked data paths, a group of a plurality of pieces of hardware configuration information (IP) of the DRP are generated. At this time, information such as the above rank information or the like is added to the hardware configuration information (IP) group of the DRP in addition to each individual hardware configuration information of the DRP.

Furthermore, the hardware configuration information (IP) group of the DRP describes designation information of pipeline processing or parallel processing of individual data path planes in the reproduction processing as needed.

The DRP configuration information embedding module 512 can embed the hardware configuration information generated in step S903 in the video content. The DRP configuration information embedding module 512 predicts data paths of the reproduction processing in accordance with the content of the video content, and can embed the hardware configuration information in the video content in turn from data paths which are used frequently. For example, as shown in FIGS. 14A and 14B, the DRP configuration information embedding module 512 can embed a group of a plurality of pieces of hardware configuration information (IP) in the header field at the head of the video content.

By pipeline designation of the reproduction processing, not only the same processing sequence as software processing is replaced by hardware processing, but also a plurality of processing blocks in the reproduction processing can undergo pipeline processing and parallel processing and their processing results can be combined.

Assume that the hardware configuration information of the DRP required to configure data paths corresponding to individual processing blocks of the reproduction processing is compiled in advance and is stored in the storage device 204 of the information delivery apparatus 101.

(Processing of Video Delivery Module 501)

Figure 10:
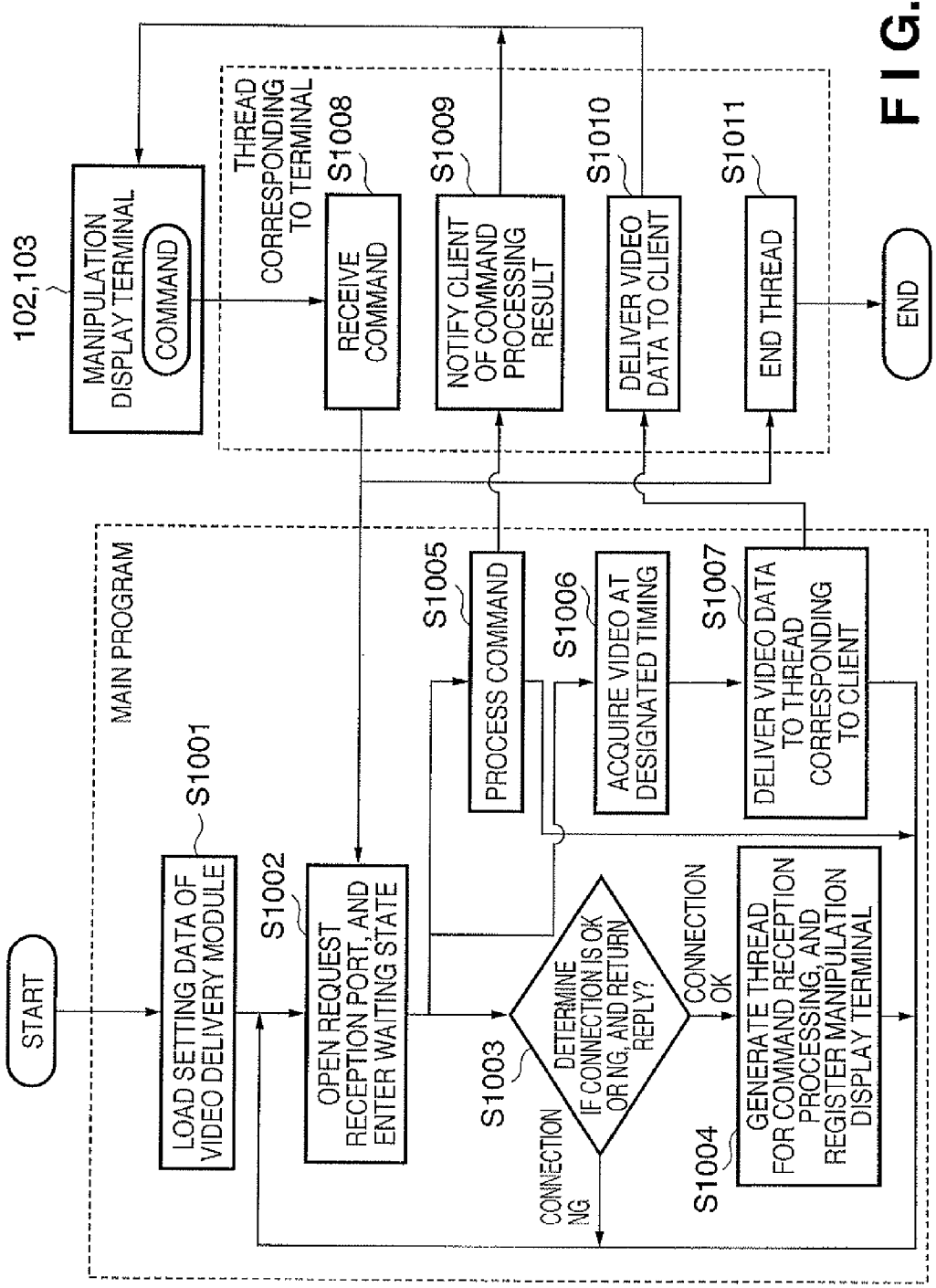
FIG. 10 is a flowchart for explaining the processing of the video delivery module 501 in the information delivery apparatus 101.

The processing of the video delivery module 501 will be described below. FIG. 10 is a flowchart for explaining the processing of the video delivery module 501 in the information delivery apparatus 101. The CPU 201 executes the processing of the video delivery module 501.

In step S1001, the CPU 201 reads out operation setting information of the video delivery module, and starts an operation based on the operation setting information. In this step, the CPU 201 generates a thread for acquiring and encoding the video content (in an idle state at the time of generation).

In step S1002, the CPU 201 opens a request reception port, and enters a waiting state (request reception state) to wait for a request from the manipulation display terminal 102 or 103 as a client.

Upon reception, as a request, of, e.g., a video delivery request, a command request such as encode parameter change, browsing, or the like, and so forth, the CPU 201 exits step S1002 and advances the process to step S1005 to process various commands. On the other hand, if a command is a connection request from the manipulation display terminal 102 or 103, the CPU 201 checks in step S1003 if connection is OK or NG.

If it is determined in step S1003 that connection is NG, the CPU 201 returns an error code indicating that connection is NG, and returns the process to step S1002.

On the other hand, if connection is OK, the CPU 201 advances the process to step S1004. The CPU 201 generates, as connection processing, a thread (corresponding to steps S1008 to S1011) which executes reception processing of a command as the manipulation display terminal 102 or 103 as a client. The CPU 201 registers the manipulation display terminal 102 or 103 as a client. If the thread that acquires and encodes the video content is idle, the CPU 201 exits this step after it instructs that thread to start its operation, and returns the process to step S1002.

Of the flowchart shown in FIG. 10, steps S1008 to S1011 form a flowchart for explaining the processing of the thread which is generated by the process in step S1004 and corresponds to each client.

In step S1008, the CPU 201 receives a command from the corresponding client. If a command from the manipulation display terminal 102 or 103 reaches, the CPU 201 receives the command, and transfers it to step S1002 of a main program that implements the video delivery processing.

The CPU 201 receives the command in step S1002 of the main program, and if that command is an encode parameter change command, browsing command, or the like, the CPU 201 advances the process to step S1005.

The CPU 201 executes the processing of the received command (for example, a change manipulation of settings associated with video encode or the like, browsing in the information delivery apparatus, or the like) in step S1005. The CPU 201 notifies step S1009 of the thread corresponding to the client, which receives the command request, of the command processing result (a code indicating success or failure of the manipulation or a browsing result).

In step S1009, the CPU 201 notifies the manipulation display terminal 102 or 103 as the client of the result transferred from the process in step S1005 of the main program.

On the other hand, in step S1006 of the main program side, the CPU 201 executes processing corresponding to an operation start instruction to the thread, which acquires and encodes the video content, in step S1004. That is, in step S1006 the CPU 201 acquires video data at time intervals which are set in advance. For example, the information delivery apparatus 101 acquires video data (video content) from the image capturing device 110 via the USB interface 205, and encodes the video data as needed. Alternatively, the information delivery apparatus 101 acquires a video content stored in itself, and encodes video data as needed.

Furthermore, in step S1007 the CPU 201 delivers the encoded video data to the thread corresponding to the client.

In the process of the thread corresponding to the client in step S1010, the CPU 201 checks the presence/absence of a next video frame sending request from the client. If the request is present, the CPU 201 delivers the encoded video data to the client (manipulation display terminal 102 or 103).

In the process of the thread corresponding to the client, the information delivery apparatus 101 receives a next video frame sending request (which is generally returned in response to completion of reception of video data at the client) from the client. At this time, the CPU 201 sets a video frame sending request flag. If this flag is set, the information delivery apparatus 101 continues acquisition and delivery of the next video data. Upon reception of a connection end command from the client (manipulation display terminal 102 or 103), the information delivery apparatus 101 notifies the main program of the connection end command, and ends its own thread in step S1011.

The information delivery apparatus 101 delivers the encoded video data (video content) to the client in step S1010. This video content is embedded with a hardware configuration information group of the DRP 407 according to the encode content at the time of first delivery, at the time of changes in encoding parameter, or the like. The hardware configuration information group is the processing result of the DRP configuration information generation module described using FIG. 9. The hardware configuration information can be embedded in the video content by adding it to, e.g., a user defined field in a header field or the like of the format in the video content.

(Processing of Image Capturing Device Control Module 502)

Figure 11:
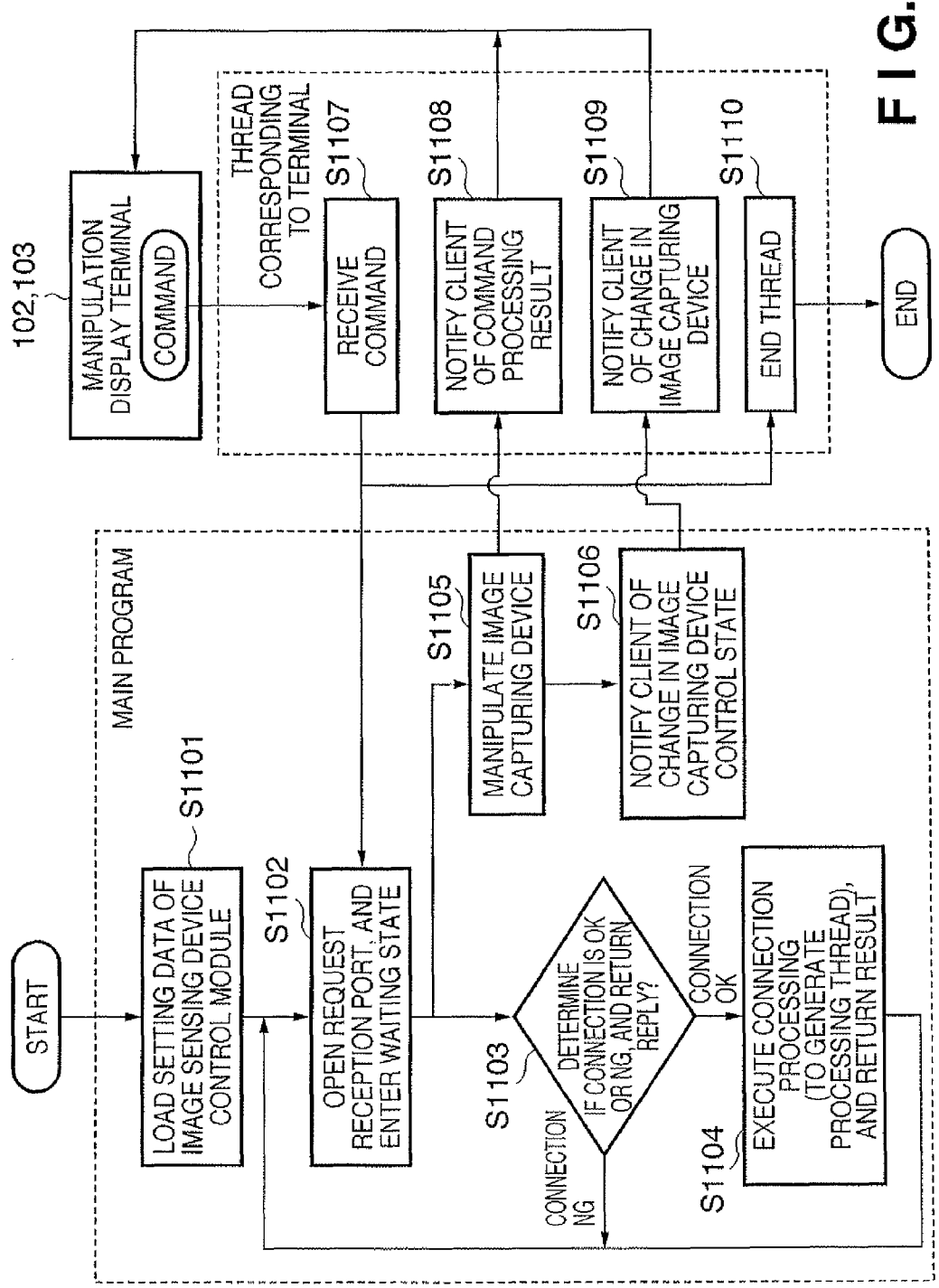
FIG. 11 is a flowchart for explaining the processing of an image capturing device control module 502 in the information delivery apparatus 101.

The processing of the image capturing device control module 502 will be described below. FIG. 11 is a flowchart for explaining the processing of the image capturing device control module 502 in the information delivery apparatus 101. The CPU 201 executes the processing of the image capturing device control module 502.

In step S1101, the CPU 201 reads out operation setting information of the image capturing device control module 502, and starts an operation based on the operation setting information.

In step S1102, the CPU 201 opens a request reception port, and enters a waiting state (request reception state) to wait for a request from the manipulation display terminal 102 or 103 as a client. That is, the CPU 201 waits for a request from the manipulation display terminal 102 or 103 as the client.

Upon reception, as a request, of, e.g., a command request associated with control of the image capturing device 110, or the like, the CPU 201 exits step S1102 and advances the process to step S1105 to process various commands. On the other hand, if a command is a connection request from the manipulation display terminal 102 or 103, the CPU 201 checks in step S1103 if connection is OK or NG.

If it is determined in step S1103 that connection is NG, the CPU 201 returns an error code indicating that connection is NG, and returns the process to step S1102.

On the other hand, if connection is OK, the CPU 201 advances the process to step S1104. The CPU 201 generates, as connection processing, a thread (corresponding to steps S1107 to S1110) which executes reception processing of a command as the manipulation display terminal 102 or 103 as a client. The CPU 201 registers the manipulation display terminal 102 or 103 as a client, and returns the process to step S1102.

Of the flowchart shown in FIG. 11, steps S1107 to S1110 form a flowchart for explaining the processing of the thread which is generated by the process in step S1104 and corresponds to each client.

In step S1107, the CPU 201 receives a command from the corresponding client. If a command from the manipulation display terminal 102 or 103 reaches, the CPU 201 receives the command, and transfers it to step S1102 of a main program that implements control of the image capturing device 110 (manipulations of the image capturing device).

The CPU 201 receives the command in step S1102 of the main program, and if that command is a manipulation command of the image capturing device 110, the CPU 201 advances the process to step S1105.

The CPU 201 executes the manipulation of the image capturing device 110 in accordance with the received command in step S1105. The CPU 201 notifies the thread corresponding to the client, which receives the manipulation request of the image capturing device 110, of the command processing result (a code indicating success or failure of the manipulation).

In step S1108, the CPU 201 notifies the manipulation display terminal 102 or 103 as the client of the result transferred from the process in step S1105 of the main program.

On the other hand, in step S1106 of the main program side, the CPU 201 notifies the thread corresponding to the client of a change in control state (e.g., a change in pan, tilt, or zoom value) which has occurred by the manipulation of the image capturing device 110. In the processing of the thread corresponding to the client, the CPU 201 notifies the client of a change in control state of the image capturing device 110 in step S1109.

Upon reception of a connection end command from the client (manipulation display terminal 102 or 103), the thread corresponding to the client notifies the main program of the connection end command, and ends itself in step S1110.

Note that a plurality of manipulation dis terminals can request assignment of the manipulation right of the image capturing device 110 before issuance of practical manipulation commands in terms of handling of manipulation commands to avoid contention of the process upon input of manipulation commands of the image capturing device 110. In this case, each manipulation display terminal issues a request command of acquisition of the control right of the image capturing device 110. Upon reception of this request command, the processing of the image capturing device control module 502 selects one of processes of rejection, assignment, and waiting from the current assigned state of the image capturing device control right, and returns the selected process to the manipulation display terminal, thus arbitrating assignment of the image capturing device control right.

The image capturing device control right is deprived due to, e.g., an elapse of shorter one of a specific time period determined in advance or a time period until the manipulation display terminal ends connection, and is assigned to the manipulation display terminal in the waiting state. The client (manipulation display terminal) can control the image capturing device 110 by issuing manipulation commands during a period from acquisition to deprival of the image capturing device control right.

(Processing of Setting Module 505)

Figure 12:
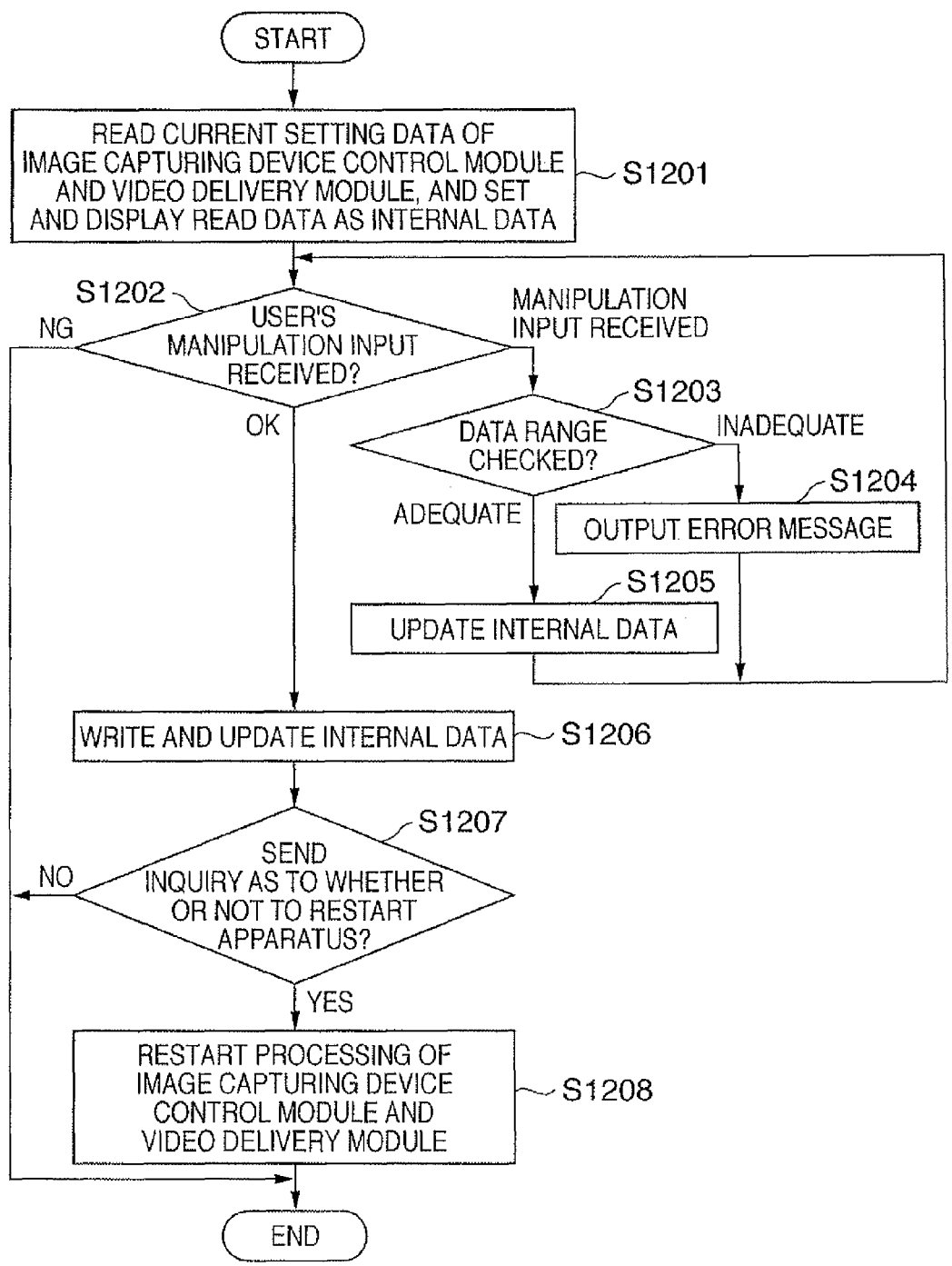
FIG. 12 is a flowchart for explaining the processing of a setting module 505 in the information delivery apparatus 101.

The processing of the setting module 505 will be described below. FIG. 12 is a flowchart for explaining the processing of the setting module 505 in the information delivery apparatus 101. The CPU 201 executes the processing of the setting module 505.

In step S1201, the CPU 201 reads out setting information associated with the image capturing device control module 502 and video delivery module 501, and sets the readout information as internal data. The set internal data is displayed on the display device 207 of the information delivery apparatus 101. Data set as the internal data includes, e.g., data associated with network settings of a network interface, and values associated with band limitations (including QoS settings) and encryption key information. The data associated with the network settings includes, e.g., an IP address, subnet address, subnet mask, routing address, multicast advisability, and the like. The encryption key information includes, e.g., information such as IPsec settings in case of IPv6, WEP (Wired Equivalent Privacy) setting of a wireless LAN, and the like.

The CPU 201 can set addition or deletion of hardware configuration information (IP) of the compiled DRP stored in the storage device 204 of the information delivery apparatus 101 or use advisability of the DRP by this processing.

Assume that the setting information (internal data) is stored in a specific file or a system database such as a registry or the like. The CPU 201 receives user's manipulation inputs (e.g., manipulation inputs of the information delivery apparatus 101 or instructions from the manipulation display terminals 102 and 103), and reflects the user's manipulation inputs in the internal data by repeating step S1202 and subsequent steps.

In step S1202, the CPU 201 waits for a user's manipulation input. Upon reception of a manipulation input associated with change or updating of the internal data, the CPU 201 advances the process to step S1203.

The CPU 201 checks in step S1203 if the manipulation input (e.g., a manipulation input value) falls within an adequate range, thus determining the adequacy of the manipulation input. Upon determining the adequacy of the manipulation input, for example, when the setting information (internal data) suffers inconsistency, or when a parameter setting or the like beyond the specification of hardware is made as the manipulation input, it is determined that such manipulation input is inadequate.

If the manipulation input is inadequate, the CPU 201 advances the process to step S1204 to output an error message. The CPU 201 returns the process to step S1202 without reflecting the user's manipulation input received in step S1202 above in the internal data.

On the other hand, if it is determined in step S1203 that the manipulation input is adequate, the CPU 201 advances the process to step S1205. The CPU 201 then updates the internal data displayed on the display device 207 and returns the process to step S1202.

In step S1202, the CPU 201 displays the updated internal data on the display device 207 to allow the user to confirm the updated internal data. Upon reception of an input such as selection of an "OK" button (not shown) or the like that accepts the updated content of the internal data, the CPU 201 advances the process to step S1206. On the other hand, upon detection of selection of, e.g., an "NG" button (not shown) which indicates that the user determines that the updating of the internal data is inadequate (NG in S1202), the CPU 201 ends the process.

In step S1206, the CPU 201 writes the internal data in a specific file or the like which stores the internal data associated with the image capturing device control module 502 and video delivery module 501, thus updating the content of the file.

In step S1207, the CPU 201 displays, on the display device 207, an inquiry dialog as to whether or not to restart the information delivery apparatus 101 to reflect the updated internal data.

If the information delivery apparatus 101 is to be started (YES in S1207), the CPU 201 advances the process to step S1208 to restart the image capturing device control module 502, video delivery module 501, and the like, thus ending the processing of the setting module. If it is determined in step S1207 that the information delivery apparatus 101 is not to be restarted (NO in S1207), the CPU 201 ends the processing.

The information delivery apparatus according to this embodiment, which delivers the video content, predicts the reproduction processing status in each manipulation display terminal, and can embed hardware configuration information in the video content in correspondence with the prediction result.

According to this embodiment, by embedding the hardware configuration information in the video content, the video content can be reproduced under the conditions suited to the video content to be reproduced and the hardware resources of the manipulation display terminal. In this way, the video content reproduction processing can be implemented with low cost and low consumption power.

Modification of First Embodiment

The first embodiment has exemplified the case wherein the hardware configuration information is optimized while paying attention to the decode processing of compressed signals in the reproduction processing. However, application of the hardware configuration information is not limited to the decode processing. For example, when the hardware configuration information is applied to authentication processing, encryption/decryption processing, or the like, the copyrights of video content and the like can be further securely protected using key information securely held in hardware.

When the hardware configuration information is applied to high-image quality processing on the reproduction side such as de-blocking filter processing or the like, hardware high-image quality processing with a scale without excess or deficiency in image quality level can be implemented according to the video content.

The first embodiment has exemplified the case wherein the data paths are ranked while paying attention mainly to the use statistics (frequencies) of data paths of the decode processing (to decode compressed signals) in the reproduction processing. However, the present invention is not limited to such specific criteria of ranking. For example, ranking criteria that minimize, e.g., the memory access of intermediate data may be adopted. Furthermore, ranking criteria that use a processing method (data resident type processing method) that switches data path planes while holding intermediate data in the memory elements ME 302 in the DRP 407 may be adopted.

The first embodiment has exemplified the case wherein each of the manipulation display terminals 102 and 103 comprises the dynamically reconfigurable DRP 407. However, the gist of the present invention is not limited to such specific example. For example, the information delivery apparatus 101 may comprise the DRP 407. In this case, not only flexible encoding processing of media can be implemented, but also communication offloading according to the video delivery status can be implemented. Hence, the processing can be further efficiently made compared to the conventional software processing. Especially, remarkable effects can be obtained when the information delivery apparatus 101 is managed under limited power environments such as PoE (Power over Ethernet: for example, IEEE802.3af standard), battery driving, and the like.

This embodiment has explained the information delivery apparatus 101 to which the digital camera is detachable as the image capturing device 110. However, the gist of the present invention is not limited to such specific example. For example, a network camera which incorporates the image capturing device 110 may be used as the information delivery apparatus 101. More specifically, in the process in step S1006 in FIG. 10, video data are acquired from the image capturing device 110 (digital camera) at time intervals which are set in advance via the USB interface. Alternatively, video data may be acquired from the network camera.

The first embodiment has exemplified the case wherein the hardware configuration information which is compiled in advance is stored in the storage device 204 of the information delivery apparatus 101. However, the gist of the present invention is not limited to such specific example. For example, the hardware configuration information of the DRP may be stored in a NAS in the network or a server on the Internet. In this case, the latest hardware configuration information stored in the server on the Internet may be copied to the storage device 204 of the information delivery apparatus 101 periodically or in accordance with a user's instruction.

The hardware configuration information of the DRP may be generated by software processing. For example, generation rules of the hardware configuration information are determined, and are compiled to generate hardware configuration information in consideration of the attributes of the video content, the status of hardware resources on the reproduction side, and the like.

In this case, the information delivery apparatus 101 may generate the hardware configuration information or another information processing apparatus (not shown) connected to the network 105 may execute generation processing and may send the result to the information delivery apparatus 101.

With the above arrangement, the video content reproduction processing can be implemented with low cost and low consumption power.

Second Embodiment

This embodiment will explain an arrangement in which the dynamically reconfigurable processor (DRP) 407 is arranged in each of the manipulation display terminals 102 and 103 as in the first embodiment. In the following description, the same reference numerals in this embodiment denote the same parts as in the first embodiment.

The information delivery apparatus 101 predicts the reproduction processing status in each of the manipulation display terminals 102 and 103, and can embed hardware configuration information (IP) in a video content in correspondence with the prediction result. The video content to be reproduced in this embodiment is continuous media data (moving image). The information delivery apparatus 101 extracts divisions of a video content as continuous media data (moving image) in the time axis direction. The information delivery apparatus 101 is characterized by comprising an arrangement that embeds hardware configuration information of a corresponding DRP 407 in each divided video content unit (segment).

The divisions of a typical video content in this embodiment include units such as GOP (Group of Pictures) and GOV (Group of VOPs) of MPEG-2 and MPEG-4. Also, the video content may be divided in synchronism with signals which detect scene changes of the video content.

Figure 15:
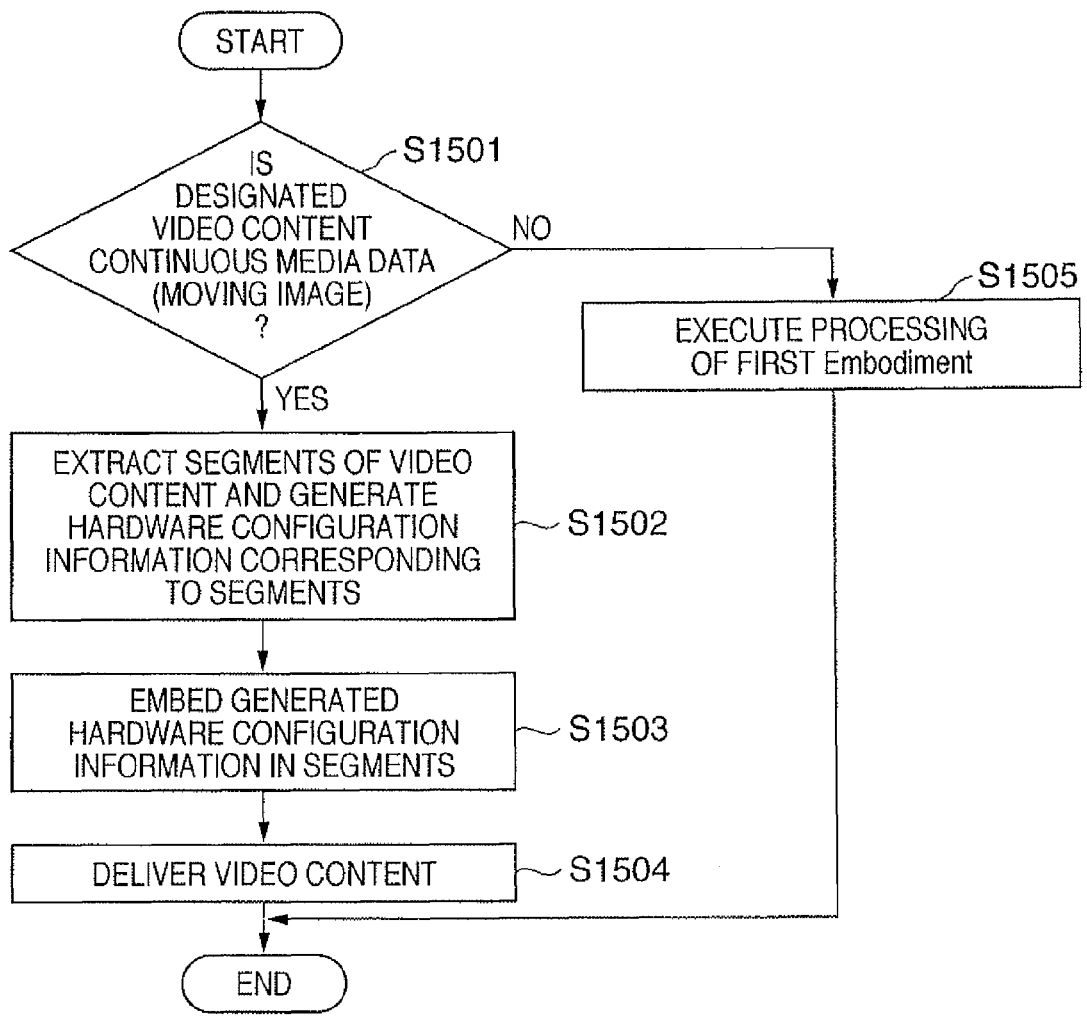
FIG. 15 is a flowchart showing the procedure of the schematic processing according to the second embodiment from the viewpoint of a difference from the first embodiment.

FIG. 15 is a flowchart showing the procedure of the schematic processing according to the second embodiment from the viewpoint of a difference from the first embodiment. The CPU 201 executes the processing of the DRP configuration information generation module 511, DRP configuration information embedding module 512, and video delivery module 501 in the information delivery apparatus 101.

The CPU 201 checks in step S1501 if a video content designated by the user is continuous media data (moving image). If the designated video content is not continuous media data (moving image) (NO in S1501), the CPU 201 advances the process to step S1505 to execute the video content delivery processing described in the first embodiment.

If it is determined in step S1501 that the designated video content is continuous media data (moving image) (YES in S1501), the CPU 201 advances the process to step S1502. In step S1502, the CPU 201 extracts divisions of the video content, and generates corresponding hardware configuration information (IP) for each divided video content unit (segment) in the processing of the DRP configuration information generation module 511.

In the processing of the DRP configuration information generation module 511, the CPU 201 extracts segments of the video content, and collects information of the video content segments as in the process in step S901 in FIG. 9. Furthermore, as in the process in step S902 in FIG. 9, the CPU 201 predicts process of the decode processing for each segment based on the collected information, and generates a hardware configuration information (IP) group of the DRP for respective segments.

In step S1503, the CPU 201 embeds hardware configuration information corresponding to each segment generated in step S1502 in the video content in the processing of the DRP configuration information embedding module 512. In the processing of the DRP configuration information embedding module 512, the CPU 201 predicts data paths of the reproduction processing in accordance with the content of the video content. The CPU 201 can embed hardware configuration information in respective segments of the video content (continuous media data) in turn from data paths which are used frequently. For example, as shown in FIG. 14C, a group of a plurality of pieces of hardware configuration information can be embedded in header fields 1401 to 1403 at the heads of respective segments 1404 to 1406.

The practical processing for, e.g., generating hardware configuration information corresponding to each segment is executed by the same processes as in steps of the flowchart shown in FIG. 9.

In the processing of the video delivery module 501 in step S1504, the CPU 201 executes processing corresponding to that in FIG. 10 of the first embodiment. In the processing corresponding to step S1009, the CPU 201 delivers the encoded video content. In this case, the CP 201 embeds, for respective segments, a hardware configuration information group according to the encode content at the time of first delivery, at the time of changes in encoding parameter, or the like.

The video delivery module 501 delivers the encoded video content (segments 1, 2, and 3 in FIG. 14C) embedded with the hardware configuration information (IP1, IP2, and IP3) in each segment, thus ending the processing.

Upon reception of the delivered video content, the manipulation display terminal 102 or 103 launches the reproduction module 522 and executes the reproduction processing by the processing of the video reproduction display module 503. The video reproduction display module 503 appropriately demultiplexes video data, audio data, and a hardware configuration information group multiplexed on a communication path upon transferring the information of the video content to the reproduction module 522, as in the first embodiment.

In the processing corresponding to step S605 in FIG. 6, the reproduction module 522 set up by the CPU 201 executes the reproduction processing using the DRP configured based on the hardware configuration information corresponding to each segment. If the hardware configuration information corresponding to each segment requires, re-setup and substitution of the reproduction module are made as in the first embodiment.

The information delivery apparatus according to this embodiment, which delivers a video content, can embed a plurality of pieces of hardware configuration information in divisions (segments) of the video content in accordance with the time axis of the video content serving as continuous media data.

According to this embodiment, by embedding hardware configuration information in continuous media data, the video content can be reproduced under the conditions according to the hardware resources of the manipulation display terminal. As a result, the reproduction processing of the video content can be implemented at low cost and low consumption power.

According to this embodiment, efficient video content delivery can be attained when the entire video content cannot be recognized at the time of delivery and only content information can be recognized like in streaming delivery of real-time video data.

Modification of Second Embodiment

The second embodiment has exemplified the case wherein the DRP configuration information generation module 511 is applied to a part (segment) of the video content. However, an intermediate operation may be used. For example, the processing of the DRP configuration information generation module 511 is applied to a part (segment) of the video content, and log information of a hardware configuration information group generated so far may be reflected in the video content to be reproduced.

The second embodiment has exemplified the case wherein hardware configuration information based on the prediction result of the processing content on the reproduction side (manipulation display terminal 102 or 103) is embedded in a part (segment) of the video content upon delivering the video content. However, embedding in a part of the video content may not often be synchronized with generation of hardware configuration information based on the prediction result. In such case, for example, the reconfiguration processing (loading and rewriting of hardware configuration information) time of the DRP 407 on the reproduction side is calculated/predicted, and hardware configuration information can be delivered at an appropriate timing in a video stream.

With the above arrangement, the video content reproduction processing can be implemented with low cost and low consumption power.

Other Embodiments

Note that the objects of the present invention are also achieved by supplying a storage medium, which records a program code of a software program that can implement the functions of the above-mentioned embodiments to a system or apparatus. Also, the objects of the present invention are also achieved by reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, ROM, and the like may be used.

The functions of the above-mentioned embodiments may be implemented by executing the readout program code by the computer. Also, functions of the above-mentioned embodiments may be implemented by some or all of actual processing operations executed by an OS (operating system) running on the computer on the basis of an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-95852, filed Mar. 30, 2006, which is hereby incorporated by reference herein in its entirety.

The invention claimed is:

1. An information delivery apparatus which can deliver content information to a receiving apparatus, said information delivery apparatus comprising:
a generation unit constructed to generate configuration information required to configure a plurality of data paths which indicate sequences of a plurality of processes to be executed in order that a reconfigurable processor reproduces the content information in accordance with the generated configuration information, and generate frequencies with regard to respective ones of the plurality of data paths to be used in order to reproduce the content information, wherein the reconfigurable processor is included in the receiving apparatus for decoding the content information; and
a delivery unit constructed to deliver the content information together with the configuration information and level information for selecting the plurality of data paths in accordance with the frequencies to the receiving apparatus.

2. The apparatus according to claim 1, wherein the configuration information includes designation information of at least one of pipeline processing and parallel processing between the data paths.

3. The apparatus according to claim 1, wherein said generation unit generates the configuration information in accordance with a status of hardware resources of the receiving apparatus.

4. The apparatus according to claim 1, wherein the content information is moving image information, and said generation unit extracts divisions of content information, and generates configuration information corresponding to divided content information.

5. An information processing system, comprising:
the information delivery apparatus according to claim 1; and
the receiving apparatus which receives and reproduces the content information delivered by the information delivery apparatus,
the receiving apparatus comprising:
the reconfigurable processor constructed to decode the content information;
an assignment unit constructed to assign resources of said reconfigurable processor which reproduces the content information; and
a configuration unit constructed to configure data paths of the resources of said reconfigurable processor assigned by said assignment unit based on the configuration information and the level information delivered by the delivery unit of the information delivery apparatus.

6. The system according to claim 5, wherein said assignment unit assigns the resources of said reconfigurable processor in accordance with at least one of a size and operating status of said reconfigurable processor.

7. The system according to claim 5, wherein said configuration unit configures the data paths of the resources of said reconfigurable processor based on the configuration information with a higher priority order.

8. The apparatus according to claim 1, wherein the content information is encoded using a different parameter for each time period, and said generation unit generates the configuration information for each time period.

9. The apparatus according to claim 1, wherein said generation unit generates the configuration information in accordance with a scene change of the content information.

10. An information processing method in an information processing system having an information delivery apparatus and a receiving apparatus, wherein the information delivery apparatus can deliver content information to the receiving apparatus, said method performed in the information delivery apparatus comprising:
a generation step of generating configuration information required to configure a plurality of data paths which indicate sequences of a plurality of processes to be executed in order that a reconfigurable processor reproduces the content information in accordance with the generated configuration information, and generating frequencies with regard to respective ones of the plurality of data paths to be used in order to reproduce the content information, wherein the reconfigurable processor is included in the receiving apparatus for decoding the content information; and
a delivery step of delivering the content information together with the configuration information and level information for selecting the plurality of data paths in accordance with the frequencies, to the receiving apparatus.

11. The method according to claim 10, wherein the configuration information includes designation information of at least one of pipeline processing and parallel processing between the data paths.

12. The method according to claim 10, further comprising steps performed in the receiving apparatus which receives and reproduces the content information delivered by the information delivery apparatus, the steps performed by the receiving apparatus comprising:
an assignment step of assigning resources of the reconfigurable processor which decodes the content information;
a configuration step of configuring data paths of the resources of the reconfigurable processor assigned in the assignment step based on the configuration information and the level information delivered by the deliver step of the information delivery apparatus; and
a decoding step of decoding the delivered content information using the data paths of the reconfigurable processor, which are configured in the configuration step.

13. The method according to claim 12, wherein in the assignment step, the resources of the reconfigurable processor are assigned in accordance with at least one of a size and operating status of the reconfigurable processor.

14. The method according to claim 12, wherein the data paths of the resources of the reconfigurable processor are configured in the configuration step based on the configuration information with a higher priority order.

15. The method according to claim 10, wherein the content information is encoded using a different parameter for each time period, and said generation step generates the configuration information for each time period.

16. The method according to claim 10, wherein said generation step generates the configuration information in accordance with a scene change of the content information.

17. The method according to claim 10, wherein the generation step generates the configuration information in accordance with a status of hardware resources of the receiving apparatus.

18. A non-transitory computer-readable storage medium storing computer executable code of a program for making an information delivery apparatus, in an information processing system having the information delivery apparatus and a receiving apparatus, execute the following steps:

a generation step of generating configuration information required to configure a plurality of data paths which indicate sequences of a plurality of processes to be executed in order that a reconfigurable processor reproduces content information in accordance with the generated configuration information, and generating frequencies with regard to respective ones of the plurality of data paths to be used in order to reproduce the content information, wherein the reconfigurable processor is included in the receiving apparatus for decoding the content information; and a delivery step of delivering the content information together with the configuration information and level information for selecting the plurality of data paths in accordance with the frequencies, to the receiving apparatus.

19. The non-transitory computer-readable storage medium according to claim 18, wherein the content information is encoded using a different parameter for each time period, and said generation step generates the configuration information for each time period.

20. The medium according to claim 18, wherein said generation step generates the configuration information in accordance with a scene change of the content information.

* * * * *